(12) United States Patent
Wiser

(10) Patent No.: US 9,654,674 B1
(45) Date of Patent: May 16, 2017

(54) IMAGE SENSOR WITH A PLURALITY OF LIGHT CHANNELS

(71) Applicant: Verily Life Sciences LLC, Mountain View, CA (US)

(72) Inventor: Robert Francis Wiser, Cupertino, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 175 days.

(21) Appl. No.: 14/135,851

(22) Filed: Dec. 20, 2013

(51) Int. Cl.
*H04N 7/18* (2006.01)
*H04N 5/225* (2006.01)
*H04N 5/232* (2006.01)

(52) U.S. Cl.
CPC ....... *H04N 5/2251* (2013.01); *H04N 5/23203* (2013.01)

(58) Field of Classification Search
CPC .................................................. H04N 5/2251
USPC ......................................................... 348/158
See application file for complete search history.

(56) References Cited

U.S. PATENT DOCUMENTS

| | | | |
|---|---|---|---|
| 3,958,560 A | 5/1976 | March | |
| 4,014,321 A | 3/1977 | March | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,214,014 A | 7/1980 | Hofer et al. | |
| 4,309,085 A | 1/1982 | Morrison | |
| 4,312,575 A | 1/1982 | Peyman et al. | |
| 4,401,371 A | 8/1983 | Neefe | |

(Continued)

FOREIGN PATENT DOCUMENTS

| | | |
|---|---|---|
| EP | 0369942 | 5/1990 |
| EP | 0686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

(Continued)

*Primary Examiner* — Richard Torrente
(74) *Attorney, Agent, or Firm* — McDonnell Boehnen Hulbert & Berghoff LLP

(57) ABSTRACT

An eye-mountable device includes an image sensor situated in a polymeric material configured to be mounted to a surface of an eye. The image sensor can be disposed on a substrate at least partially embedded in the polymeric material. The image sensor can include a photo-sensitive area occupied by a plurality of photo-sensitive elements. The photo-sensitive area is illuminated by light entering a plurality of light channels. Each of the light channels has a respective orientation such that light passes through a given light channel from a respective direction. A given portion of the photo-sensitive elements therefore receives light from a respective direction corresponding to the one of the light channels that illuminates it. The direction-specific measurements of received light obtained by the multiple photo-sensitive elements can thereby be used to form an image.

13 Claims, 10 Drawing Sheets

(56) References Cited

U.S. PATENT DOCUMENTS

| | | |
|---|---|---|
| 4,463,149 A | 7/1984 | Ellis |
| 4,555,372 A | 11/1985 | Kunzler et al. |
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint et al. |
| 5,177,165 A | 1/1993 | Valint et al. |
| 5,177,168 A | 1/1993 | Baron et al. |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicolson et al. |
| 5,908,906 A | 6/1999 | Kunzler et al. |
| 5,981,669 A | 11/1999 | Valint et al. |
| 6,087,941 A | 7/2000 | Ferraz et al. |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,197,539 B2 | 6/2012 | Nasiatka et al. |
| 8,224,415 B2 | 7/2012 | Budiman |
| 8,478,081 B2 | 7/2013 | Paillet et al. |
| 8,530,265 B2 | 9/2013 | Fan |
| 8,885,987 B2 * | 11/2014 | Augusto ........... G02B 6/12 385/14 |
| 2002/0193674 A1 | 12/2002 | Fleischman et al. |
| 2003/0021601 A1 * | 1/2003 | Goldstein ......... G03B 17/00 396/263 |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0205885 A1 * | 9/2005 | Nakagawa ........ G02B 6/138 257/98 |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2008/0233417 A1 * | 9/2008 | Kuramoto ............ C08K 5/10 428/480 |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |

(56) References Cited

U.S. PATENT DOCUMENTS

| | | | |
|---|---|---|---|
| 2012/0075168 | A1 | 3/2012 | Osterhout et al. |
| 2012/0075574 | A1 | 3/2012 | Pugh et al. |
| 2012/0078071 | A1 | 3/2012 | Bohm et al. |
| 2012/0088258 | A1 | 4/2012 | Bishop et al. |
| 2012/0092612 | A1 | 4/2012 | Binder et al. |
| 2012/0109296 | A1 | 5/2012 | Fan |
| 2012/0177576 | A1 | 7/2012 | Hu |
| 2012/0201755 | A1 | 8/2012 | Rozakis et al. |
| 2012/0245444 | A1 | 9/2012 | Otis et al. |
| 2012/0259188 | A1 | 10/2012 | Besling |
| 2013/0255380 | A1* | 10/2013 | Salsman ............. G01P 15/18 73/514.26 |

FOREIGN PATENT DOCUMENTS

| | | |
|---|---|---|
| EP | 1061874 | 12/2000 |
| EP | 1818008 | 8/2007 |
| EP | 1947501 | 7/2008 |
| EP | 1617757 | 8/2009 |
| EP | 2457122 | 5/2012 |
| WO | 95/04609 | 2/1995 |
| WO | 01/16641 | 3/2001 |
| WO | 01/34312 | 5/2001 |
| WO | 03/065876 | 8/2003 |
| WO | 2004/060431 | 7/2004 |
| WO | 2004/064629 | 8/2004 |
| WO | 2006/015315 | 2/2006 |
| WO | 2009/094643 | 7/2009 |
| WO | 2010/105728 | 9/2010 |
| WO | 2010/133317 | 11/2010 |
| WO | 2011/011344 | 1/2011 |
| WO | 2011/034592 | 3/2011 |
| WO | 2011/035228 | 3/2011 |
| WO | 2011/035262 | 3/2011 |
| WO | 2011/083105 | 7/2011 |
| WO | 2011/163080 | 12/2011 |
| WO | 2012/035429 | 3/2012 |
| WO | 2012/037455 | 3/2012 |
| WO | 2012/051167 | 4/2012 |
| WO | 2012/051223 | 4/2012 |
| WO | 2012052765 | 4/2012 |

OTHER PUBLICATIONS

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-µW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 µA, Addressable Gent Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Bionic contact lens 'to project emails before eyes,' http://www.kurzweilai.netforums/topic/bionic-contact-lens-to-project-emails-before-eyes, Last accessed Mar. 14, 2012, 2 pages.

Brahim, et al., "Polypyrrole-hydrogel composites for the construction of clinically important biosensors," 2002, Biosensors & Bioelectronics, pp. 53-59, vol. 17.

Chen, et al., "Microfabricated Implantable Parylene-Based Wireless Passive Intraocular Pressure Sensors," Journal of Microelectromechanical Systems, Dec. 2008, pp. 1342-1351, vol. 17, No. 6.

Chu, et al., "Soft Contact-lens Sensor for Monitoring Tear Sugar as Novel Wearable Device of Body Sensor Network," http://www.ksi edu/seke/dms11/DMS/2_Kohji_Mitsubayashi.pdf, Last accessed Jul. 27, 2012, 4 pages.

"Contact Lenses: Look Into My Eyes," The Economist, Jun. 2, 2011, http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul./Aug. 2009, pp. 48-53, vol. 8, No. 7.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Huang, et al., "Wrinkling of Ultrathin Polymer Films," Mater. Res. Soc. Symp. Proc., 2006, 6 pages, vol. 924, Materials Research Society.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Liao, et al., "A 3-µW CMOS Glucose Sensor for Wireless Contact-Lens Tear Glucose Monitoring," IEEE Journal of Solid-State Circuits, Jan. 2012, pp. 335-344, vol. 47, No. 1.

Liao, et al., "A 3-µW Wirelessly Powered CMOS Glucose Sensor for an Active Contact Lens," 2011 IEEE International Solid-State Circuits Conference, Session 2, Feb. 21, 2011, 3 pages.

Lingley, et al., "A Single-Pixel Wireless Contact Lens Display," Journal of Micromechanics and Microengineering, 2011, pp. 1-8.

Lingley, et al., "Multipurpose integrated active contact lenses," SPIE, 2009, 2 pages.

Liu, et al., "Miniature Amperometric Self-Powered Continuous Glucose Sensor with Linear Response," Analytical Chemistry, 2012, 7 pages.

(56) References Cited

OTHER PUBLICATIONS

Loncar, et al., "Design and Fabrication of Silicon Photonic Crystal Optical Waveguides," Journal of Lightwave Technology, Oct. 2000, pp. 1402-1411, vol. 18, No. 10.
Murdan, "Electro-responsive drug delivery from hydrogels," Journal of Controlled Release, 2003, pp. 1-17, vol. 92.
Pandey, et al., "A Fully Integrated RF-Powered Contact Lens With a Single Element Display," IEEE Transactions on Biomedical Circuits and Systems, Dec. 2010, pp. 454-461, vol. 4, No. 6.
Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.
Selner, et al., "Novel Contact Lens Electrode Array for Multi-electrode Electroretinography (meERG)," IEEE, 2011, 2 pages.
Singh , et al., "Novel Approaches in Formulation and Drug Delivery using Contact Lenses," Journal of Basic and Clinical Pharmacy, May 2011, pp. 87-101, vol. 2, Issue 2.
Thomas, et al., "Functional Contact Lenses for Remote Health Monitoring in Developing Countries," IEEE Global Humanitarian Technology Conference, 2011, pp. 212-217, IEEE Computer Society.
Tweedie, et al., "Contact creep compliance of viscoelastic materials via nanoindentation," J. Mater. Res., Jun. 2006, pp. 1576-1589, vol. 21, No. 2, Materials Research Society.
Wall, K., "Active contact lens that lets you see like the Terminator patented," Feb. 10, 2012, http://vvww.patexia.com/feed/active-contact-lens-that-lets-you-see-like-the-terminator-patented-2407, Last accessed Mar. 28, 2012, 5 pages.
Zarbin, et al., "Nanotechnology in ophthalmology," Can J Ophthalmol, 2010, pp. 457-476, vol. 45, No. 5.

\* cited by examiner

IMAGE SENSOR WITH A PLURALITY OF LIGHT CHANNELS

BACKGROUND

Unless otherwise indicated herein, the materials described in this section are not prior art to the claims in this application and are not admitted to be prior art by inclusion in this section.

An electronic image sensor can be formed of a pixelated array of photo-sensitive elements. The photo-sensitive elements can operate to detect incoming light via photodiodes in each element, which can be implemented in a silicon plane. Read out circuitry can be constructed from one or more thin film transistors (TFTs) associated with each photo-sensitive element. For example, a voltage corresponding to the light incident on the photodiode can be read out for each photo-sensitive element in the array. The resulting data from the pixelated array can then be used to determine a digital image representing the incoming light. Such an image sensor can be implemented using semiconductor assembly technologies, such as complementary metal-oxide-semiconductor (CMOS) technology. Such a CMOS array can be fabricated on a silicon wafer using patterned photodiodes and TFTs to provide a voltage output corresponding to the incident light. The voltage output can then be converted to a digital value and further analyzed/stored. Combining the digital values corresponding to incident light across an array of such CMOS sensors results in a digital representation of an image.

To focus incident light on the photo-sensitive layer of an electronic image sensor, a primary lens typically focuses light passing through an aperture on a focal plane coincident with the photo-sensitive layer of the image sensor. The distance from the aperture to the focal plane is the focal length. The ratio between the focal length and the aperture diameter is the focal ratio or f-stop. Typical electronic image sensors include primary lenses with a thickness of at least several millimeters and also have a typical focal length of several millimeters. As a result, electronic image sensors generally have a form factor between the primary aperture lens and photo-sensitive layer of at least roughly 10 millimeters.

SUMMARY

An ophthalmic electronics platform can include an eye-mountable camera. The ophthalmic device can include a polymeric material configured to mount to a corneal surface of an eye. An image sensor, control electronics, and an antenna can be situated on a substrate embedded in the polymeric material. The control electronics can operate the image sensor to capture an image and can operate the antenna to wirelessly communicate the readings from the image sensor to an external reader via the antenna. The image sensor includes a sensor array including multiple photo-sensitive elements configured to measure light reaching the sensor array after passing through a pattern of direction-selective light channels. The orientation of each light channel causes the light measured by each photo-sensitive element to be substantially from only one direction. The direction-specific measurements of received light from across the sensor array can thereby be used to form an image.

Some embodiments of the present disclosure provide an eye-mountable device including a polymeric material, a substrate, and an image sensor. The polymeric material can have a concave surface and a convex surface. The concave surface can be configured to be removably mounted over an eye and the convex surface can be configured to be compatible with eyelid motion when the concave surface is so mounted. The substrate can be at least partially embedded in the polymeric material. The image sensor can be disposed on the substrate. The image sensor can include a plurality of photo-sensitive elements and a plurality of light channels. Each light channel can be situated to cause a corresponding one of the photo-sensitive elements to receive incident light from a respective direction defined by the light channel.

Some embodiments of the present disclosure provide a method. The method can include transmitting an interrogation signal to an eye-mountable device. The eye-mountable device can include an image sensor including a plurality of photo-sensitive elements and a plurality of light channels, and an antenna. Each light channel can be situated to cause a corresponding one of the photo-sensitive elements to receive incident light from a respective direction defined by the light channel. The method can include receiving, from the eye-mountable device, an indication of the received light measured by the plurality of photo-sensitive elements. The method can include determining an image based on the received indication.

Some embodiments of the present disclosure provide a non-transitory computer readable medium storing instructions that, when executed by one or more processors in a computing device, cause the computing device to perform operations. The operations can include transmitting an interrogation signal to an eye-mountable device comprising an image sensor including a plurality of photo-sensitive elements and a plurality of light channels, and an antenna. Each light channel can be situated to cause a corresponding one of the photo-sensitive elements to receive incident light from a respective direction defined by the light channel. The operations can include receiving, from the eye-mountable device, an indication of the received light measured by the plurality of photo-sensitive elements. The operations can include determining an image based on the received indication.

Some embodiments of the present disclosure provide means for obtaining an image using an image sensor having a plurality of photo-sensitive elements. Embodiments may include means for causing a corresponding one of the photo-sensitive elements to receive incident light from a respective direction. Embodiments may include means for receiving an indication of received light measured by the plurality of photo-sensitive elements. Embodiments may include means for determining an image based on the received indication.

These as well as other aspects, advantages, and alternatives, will become apparent to those of ordinary skill in the art by reading the following detailed description, with reference where appropriate to the accompanying drawings.

DETAILED DESCRIPTION

Figure 1:
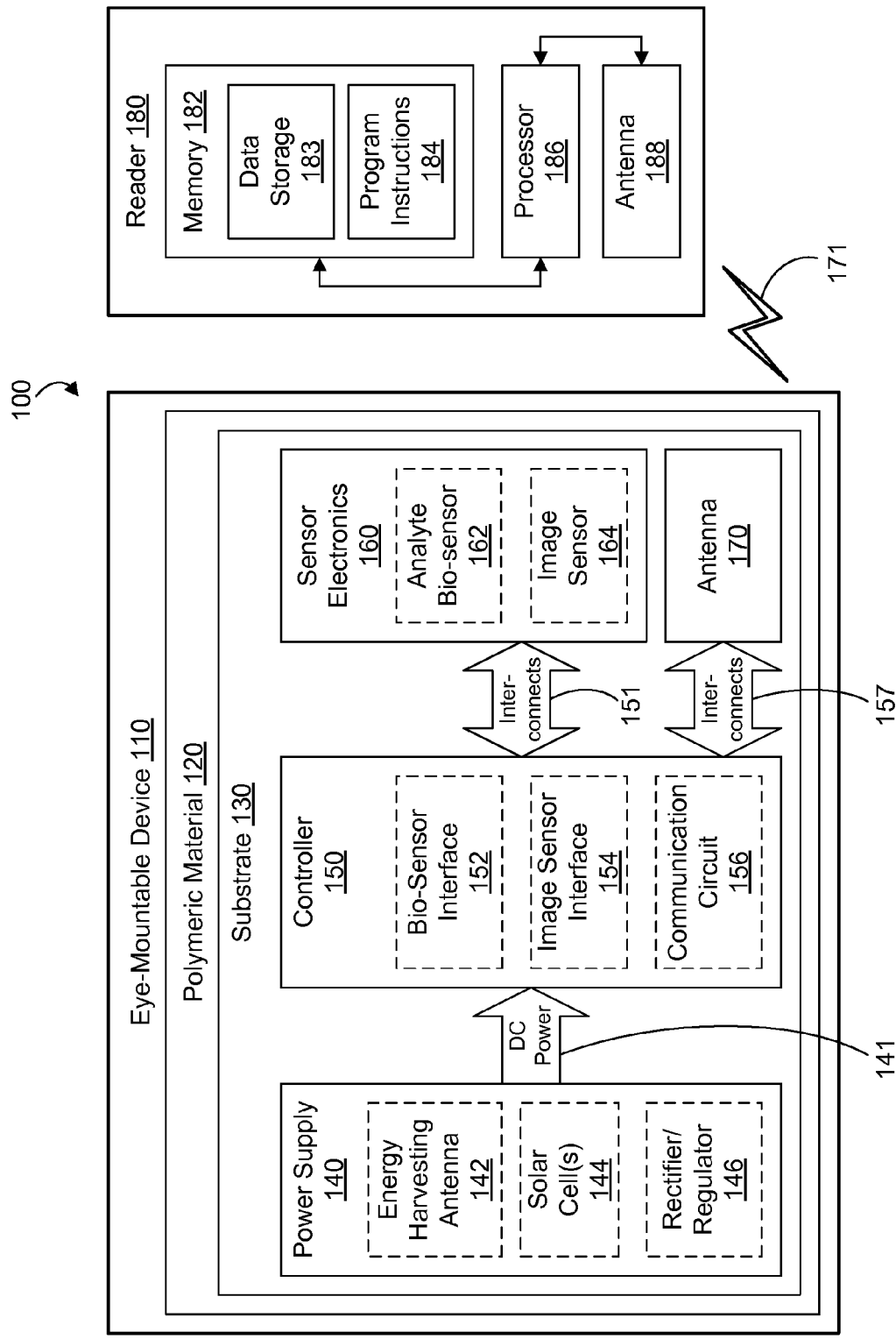
FIG. 1 is a block diagram of an example system that includes an eye-mountable device in wireless communication with an external reader.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An ophthalmic electronics platform can include an eye-mountable camera. The ophthalmic device can include a polymeric material configured to mount to a corneal surface of an eye. An image sensor, control electronics, and an antenna can be situated on a substrate embedded in the polymeric material. The control electronics can operate the image sensor to capture an image and can operate the antenna to wirelessly communicate the readings from the image sensor to an external reader via the antenna. The image sensor includes a sensor array including multiple photo-sensitive elements configured to measure light reaching the sensor array through multiple direction-dependent light channels. Each of the light channels is oriented to receive light from a respective direction. Thus, portions of the sensor array arranged to receive light through a given light channel are illuminated by light incident from a direction corresponding to the light channel. The direction-selective measurements from across the sensor array can thereby be used to form an image.

In some examples, the polymeric material can be in the form of a round lens with a concave curvature configured to mount to a corneal surface of an eye. The substrate can be embedded near the periphery of the polymeric material to avoid interference with incident light received closer to the central region of the cornea. The image sensor can be arranged on the substrate to face inward, toward the corneal surface, so as to generate images of the eye. Additionally or alternatively, the sensor can be arranged on the substrate to face outward, away from the corneal surface so as to capture images of the surrounding environment.

The ophthalmic electronics platform can receive power from radiated energy harvested at the eye-mountable device. Power can be generated from incident light energizing photovoltaic cells. Additionally or alternatively, power can be generated from incident radio frequency radiation inductively harvested using the antenna. A rectifier and/or regulator can be incorporated with the control electronics to generate a stable DC voltage to power the electronics from the harvested energy. The antenna can be arranged as a loop of conductive material with leads connected to the control electronics. In some embodiments, such a loop antenna can also wirelessly communicate the sensor readings to an external reader by modifying the impedance of the loop antenna so as to modify backscatter radiation from the antenna.

The image sensor can be implemented as an array of complementary metal oxide semiconductor (CMOS) devices disposed on a silicon wafer. A stack of metal layers over the light-sensitive elements includes aligned apertures arranged to create light channels to allow light to reach the light sensitive elements. The light channels cause different ones of the light-sensitive elements to receive light incident from different directions. A given light channel sub-tends a solid angle from which incident light can reach a corresponding light-sensitive element to give the light-sensitive element direction sensitivity. Combining multiple such light-sensitive element and light channel pairs allows for forming an image by combining the light and direction information from each light-sensitive element and light channel pair. The total field of view of the imaging system is given by the combined fields of view of the individual light channels, and the resolution of the imaging system is given by the size of the individual fields of view.

The field of view can be sub-divided into approximately equal solid angles for each light-sensitive element in the array and suitable light channels for each light-sensitive element can be formed by apertures patterned in the metal layer stack to sub-divide the total field of view. Each pixel in the array can then operate to detect the light intensity reaching each individual pixel to form an image of the scene. For example, the image sensor array can integrate intensity readings over a predetermined interval and read out the resulting set of values across the array. The integrated intensity readings across the array can then be mapped to corresponding directions based on the light channels through the opaque screen to generate an image of the surrounding environment.

Each photo-sensitive element ("pixel") in the image sensor array thereby receives light from a respective, spatially distinct region of the surrounding environment or of the eye, similar to a lens configured to focus incident light across a broad area at an imaging plane. The image sensor can thereby capture an image of the scene or the eye without using a lens. In comparison to an image capture camera system using a primary lens to focus light onto a focal plane including the image sensor array, the non-focusing aperture based image sensor system can be more compact and therefore more suitable to small form factor applications, such as ophthalmic electronics platforms. A typical focusing lens for an image capture system may have a thickness on the order of one or more millimeters, and then may have a focal length on the order of one or more millimeters. The minimum thickness of such a system is therefore typically several millimeters. By contrast, the non-focusing apertures employed herein are typically only as thick as the layered stack that forms the light channels, which could be in the range of a few micrometers to about 10 or 20 micrometers. The fully assembled image sensor system can then have a thickness of around 100 micrometers and can be suitable for being incorporated into an eye-mountable device, which may have a polymeric material with total thickness of about 200 micrometers, for example.

In one example, the image sensor array can be a 20 by 20 CMOS sensor array, with pixels (photo-sensitive elements) approximately 2 micrometers in diameter. Each pixel in the array can then operate to detect light reaching each individual pixel. An image can then be determined by combining the measurements of received light in accordance with the directions associated with each pixel in the sensor array. For example, the image sensor array can integrate light measurements over a predetermined exposure interval and read out the resulting set of values across the array (e.g., based on charge accumulated on a photodiode in each CMOS device). Other dimensions of the relative spacing between image sensor array and opaque layer, aperture dimensions, pixel dimensions, and CMOS array size can also be used.

An image sensor integrated within an eye-mountable device can be situated to capture images of a scene visible to the wearer of the eye-mountable device. In such an example, the image sensor can be situated within the polymeric material of the eye-mountable device so as to detect light incident on the eye. Thus, the direction-selective light channels can be positioned between the outward-facing surface of the polymeric material and the image sensor, such that light from the surrounding environment passes through the light channels to the image sensor array. Alternatively, the image sensor can be situated to detect light from the eye itself by positioning the direction-selective light channels between the eye-facing surface of the polymeric material and the image sensor, such that light reflected from the eye passes through the light channels to the image sensor array. Such eye-imaging applications may be used, at least in part, to obtain biometric indications for verifying a user's identity, based on images of the iris, etc.

II. Example Ophthalmic Electronics Platform

FIG. 1 is a block diagram of a system 100 that includes an eye-mountable device 110 in wireless communication with an external reader 180. The exposed regions of the eye-mountable device 110 are made of a polymeric material 120 formed to be contact-mounted to a corneal surface of an eye. A substrate 130 is embedded in the polymeric material 120 to provide a mounting surface for a power supply 140, a controller 150, sensor electronics 160, and a communication antenna 170. The sensor electronics 160 are operated by the controller 150. The power supply 140 supplies operating voltages to the controller 150 and/or the sensor electronics 160. The antenna 170 is operated by the controller 150 to communicate information to and/or from the eye-mountable device 110. The antenna 170, the controller 150, the power supply 140, and the sensor electronics 160 can all be situated on the embedded substrate 130. Because the eye-mountable device 110 includes electronics and is configured to be contact-mounted to an eye, it is also referred to herein as an ophthalmic electronics platform.

To facilitate contact-mounting, the polymeric material 120 can have a concave surface configured to adhere ("mount") to a moistened corneal surface (e.g., by capillary forces with a tear film coating the corneal surface). Additionally or alternatively, the eye-mountable device 110 can be adhered by a vacuum force between the corneal surface and the polymeric material due to the concave curvature. While mounted with the concave surface against the eye, the outward-facing surface of the polymeric material 120 can have a convex curvature that is formed to not interfere with eye-lid motion while the eye-mountable device 110 is mounted to the eye. For example, the polymeric material 120 can be a substantially transparent curved polymeric disk shaped similarly to a vision correction contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some embodiments, the polymeric material 120 can be a deformable ("non-rigid") material to enhance wearer comfort. In some embodiments, the polymeric material 120 can be shaped to provide a predetermined, vision-correcting optical power, such as can be provided by a contact lens.

The substrate 130 includes one or more surfaces suitable for mounting the sensor electronics 160, the controller 150, the power supply 140, and the antenna 170. The substrate 130 can be employed both as a mounting platform for chip-based circuitry (e.g., by flip-chip mounting to connection pads) and/or as a platform for patterning conductive materials (e.g., gold, platinum, palladium, titanium, copper, aluminum, silver, metals, other conductive materials, combinations of these, etc.) to create electrodes, interconnects, connection pads, antennae, etc. In some embodiments, substantially transparent conductive materials (e.g., indium tin oxide) can be patterned on the substrate 130 to form circuitry, electrodes, etc. For example, the antenna 170 can be formed by forming a pattern of gold or another conductive material on the substrate 130 by deposition, photolithography, electroplating, etc. Similarly, interconnects 151, 157 between the controller 150 and the sensor electronics 160, and between the controller 150 and the antenna 170, respectively, can be formed by depositing suitable patterns of conductive materials on the substrate 130. A combination of microfabrication techniques including, without limitation, the use of photoresists, masks, deposition techniques, and/or plating techniques can be employed to pattern materials on the substrate 130.

The substrate 130 can be a relatively rigid material, such as polyethylene terephthalate ("PET"), parylene, or another material configured to structurally support the circuitry and/or chip-based electronics within the polymeric material 120. The eye-mountable device 110 can alternatively be arranged with a group of unconnected substrates rather than a single substrate. For example, the controller 150 and a sensor in sensor electronics 160 can be mounted to one substrate, while the antenna 170 is mounted to another substrate and the two can be electrically connected via the interconnects 157. In another example, the substrate 130 can include separate partitions that each support separated, overlapped coiled portions of the antenna 170. Such as, for example, an example in which the antenna 170 is divided into multiple windings that wrap around the eye-mountable device 110 circumferentially at respective radii, and are connected in parallel and/or in series. To facilitate movement of the individual windings with respect to one another, and thereby enhance flexibility of the eye-mountable device 110, and help prevent binding, etc., the individual windings may each be mounted on divided portions of the substrate 130, which may substantially correspond to the windings of such an antenna.

In some embodiments, the sensor electronics 160 (and the substrate 130) can be positioned away from the center of the eye-mountable device 110 and thereby avoid interference with light transmission to the central, light-sensitive region of the eye. For example, where the eye-mountable device 110 is shaped as a concave-curved disk, the substrate 130 can be embedded around the periphery (e.g., near the outer circumference) of the disk. In some embodiments, however, the sensor electronics 160 (and the substrate 130) can be positioned in or near the central region of the eye-mountable device 110.

The substrate 130 can be shaped as a flattened ring with a radial width dimension sufficient to provide a mounting platform for the embedded electronics components. The substrate 130 can have a thickness sufficiently small to allow the substrate 130 to be embedded in the polymeric material 120 without influencing the profile of the eye-mountable device 110. The substrate 130 can have a thickness sufficiently large to provide structural stability suitable for supporting the electronics mounted thereon. For example, the substrate 130 can be shaped as a ring with a diameter of about 10 millimeters, a radial width of about 1 millimeter (e.g., an outer radius 1 millimeter larger than an inner radius), and a thickness of about 50 micrometers. The substrate 130 can optionally be aligned with the curvature of the eye-mounting surface of the eye-mountable device 110 (e.g., the convex or concave surfaces). For example, the substrate 130 can be shaped along the surface of an imaginary cone between two circular segments that define an inner radius and an outer radius. In such an example, the surface of the substrate 130 along the surface of the imaginary cone defines an inclined surface that is approximately aligned with the curvature of the eye mounting surface (concave) and/or outward surface (convex) at that radius.

The power supply 140 is configured to harvest ambient energy to power the controller 150 and sensor electronics 160. For example, a radio-frequency energy-harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the external reader 180. That is, the functions of the communication antenna 170 and the energy harvesting antenna 142 can be accomplished with the same physical antenna.

A rectifier/regulator 146 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 146. The rectifier/regulator 146 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 146 can include one or more energy storage devices to mitigate high frequency variations in the ambient energy gathering antenna 142 and/or solar cell(s) 144. For example, one or more energy storage devices (e.g., a capacitor, a battery, etc.) can be connected in parallel across the outputs of the rectifier 146 to regulate the DC supply voltage 141 and configured to function as a low-pass filter.

The controller 150 can be turned on when the DC supply voltage 141 is provided to the controller 150, and the logic in the controller 150 can then operate the sensor electronics 160 and the antenna 170. The controller 150 can include logic circuitry configured to operate the sensor electronics 160 so as to sense a characteristic of the environment of the eye-mountable device 110. For example, the sensor electronics 160 may include an analyte bio-sensor 162 configured to sense an analyte in the biological environment (e.g., tear film) of the eye-mountable device 110. Additionally or alternatively, the sensor electronics 160 could include an image sensor 164 that is configured to image an environment of the eye-mountable device 110 (e.g., an external environment outside of the eye or an internal environment within the eye).

In one example, the controller 150 includes a bio-sensor interface module 152 that is configured to operate analyte bio-sensor 162. The analyte bio-sensor 162 can be, for example, an amperometric electrochemical sensor that includes a working electrode and a reference electrode. A voltage can be applied between the working and reference electrodes to cause an analyte to undergo an electrochemical reaction (e.g., a reduction and/or oxidation reaction) at the working electrode. The electrochemical reaction can generate an amperometric current that can be measured through the working electrode. The amperometric current can be dependent on the analyte concentration. Thus, the amount of the amperometric current that is measured through the working electrode can provide an indication of analyte concentration. In some embodiments, the bio-sensor interface module 152 can be a potentiostat configured to apply a voltage difference between working and reference electrodes while measuring a current through the working electrode.

The controller 150 can include an image sensor interface 154 for operating image sensor 164. The image sensor 164 can include a photo-sensitive area populated by a plurality of photo-sensitive elements. Multiple light channels each having a respective orientation can be positioned such that light entering the light channels is received by the photo-sensitive elements. The photo-sensitive elements thus receive light from different directions depending on which of the light channels the light passes through. The photo-sensitive elements can be implemented as complementary metal oxide semiconductor (CMOS) devices, such as a device including a photodiode and one or more TFTs arranged in a circuit to facilitate reading values from the photodiode based on the quantity of light received during an integration time and/or resetting the photodiode (e.g., between subsequent image capture events). The measurements of light received at the various photo-sensitive elements across the image sensor 164 can then be associated with light from a particular direction, and the light measurements can be combined to form an image of the received light.

Thus, the image sensor 164 can be an array of separately programmable light receiving devices ("pixels") arranged in rows and columns. Each photo-sensitive element (e.g., photodiode) can be operated by individual pixel circuits to effect read out and/or reset operations according to information from the image sensor interface 154. Such an image sensor 164 can also optionally include filters associated with some of the photo-sensitive elements (e.g., red, green, and blue pixels) to capture color content information of received light. However, monochrome image sensors may also be employed. The image sensor interface 154 can include, for example, one or more data lines for providing read out data (e.g., voltage values) from the separate photo-sensitive elements of the image sensor 164 following an integration time and one or more addressing lines for setting groups of photo-sensitive elements (e.g., rows or columns) to discharge following read out and prepare for a subsequent image capture.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. In some examples, the eye-mountable device 110 is configured to indicate an output from a bio-sensor and/or image sensor by modulating an impedance of the antenna 170 in a manner that can be perceived by the external reader 180. For example, the communication circuit 156 can cause variations in the amplitude, phase, and/or frequency of backscatter radiation from the antenna 170, and such variations can be detected by the reader 180.

The controller 150 is connected to the sensor electronics 160 via interconnects 151. For example, where the controller 150 includes logic elements implemented in an integrated circuit to form the bio-sensor interface module 152 and/or image sensor interface 154, a patterned conductive material (e.g., gold, platinum, palladium, titanium, copper, aluminum, silver, metals, combinations of these, etc.) can connect a terminal on the chip to the sensor electronics 160. Similarly, the controller 150 is connected to the antenna 170 via interconnects 157.

It is noted that the block diagram shown in FIG. 1 is described in connection with functional modules for convenience in description. However, embodiments of the eye-mountable device 110 can be arranged with one or more of the functional modules ("sub-systems") implemented in a single chip, integrated circuit, and/or physical component. For example, while the rectifier/regulator 146 is illustrated in the power supply block 140, the rectifier/regulator 146 can be implemented in a chip that also includes the logic elements of the controller 150 and/or other features of the embedded electronics in the eye-mountable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply block 140 and controller block 150 need not be implemented as physically separated modules. In another example, the image sensor may be implemented by an array of photo-sensitive elements integrated on a chip that also includes the logic elements of the controller 150, etc. Moreover, one or more of the functional modules described in FIG. 1 can be implemented by separately packaged chips electrically connected to one another.

Additionally or alternatively, the energy harvesting antenna 142 and the communication antenna 170 can be implemented with the same physical antenna. For example, a loop antenna can both harvest incident radiation for power generation and communicate information via backscatter radiation.

The external reader 180 includes an antenna 188 (or a group of multiple antennas) to send and receive wireless signals 171 to and from the eye-mountable device 110. The external reader 180 also includes a computing system with a processor 186 in communication with a memory 182. The memory 182 is a non-transitory computer-readable medium that can include, without limitation, magnetic disks, optical disks, organic memory, and/or any other volatile (e.g., RAM) or non-volatile (e.g., ROM) storage system readable by the processor 186. The memory 182 can include a data storage 183 to store indications of data, such as sensor readings (e.g., from the analyte bio-sensor 162 and/or image sensor 164), program settings (e.g., to adjust behavior of the eye-mountable device 110 and/or external reader 180), etc. The memory 182 can also include program instructions 184 for execution by the processor 186 to cause the external reader 180 to perform processes specified by the instructions 184. For example, the program instructions 184 can cause external reader 180 to communicate with the eye-mountable device 110. The program instructions 184 can also cause the external reader 180 to provide a user interface that allows for retrieving information communicated from the eye-mountable device 110 (e.g., sensor outputs from the analyte bio-sensor 162 and/or image sensor 164). The external reader 180 can also include one or more hardware components for operating the antenna 188 to send and receive the wireless signals 171 to and from the eye-mountable device 110. For example, oscillators, frequency injectors, encoders, decoders, amplifiers, filters, etc. can drive the antenna 188.

The external reader 180 can be a smart phone, digital assistant, or other portable computing device with wireless connectivity sufficient to provide the wireless communication link 171. The external reader 180 can also be implemented as an antenna module that can be plugged in to a portable computing device, such as in an example where the communication link 171 operates at carrier frequencies not commonly employed in portable computing devices. In some instances, the external reader 180 is a special-purpose device configured to be worn relatively near a wearer's eye to allow the wireless communication link 171 to operate with a low power budget. For example, the external reader 180 can be integrated in a piece of jewelry such as a necklace, earring, etc. or integrated in an article of clothing or an accessory worn near the head, such as a hat, headband, a scarf, a pair of eyeglasses, etc.

In some embodiments, the system 100 can operate to non-continuously ("intermittently") supply energy to the eye-mountable device 110 to power the controller 150 and sensor electronics 160. For example, radio frequency radiation 171 can be supplied to power the eye-mountable device 110 long enough to operate the sensor electronics 160 and communicate an outcome of such operation. In such an example, the supplied radio frequency radiation 171 can be considered an interrogation signal from the external reader 180 to the eye-mountable device 110 to request feedback (e.g., a sensor measurement). By periodically interrogating the eye-mountable device 110 (e.g., by supplying radio frequency radiation 171 to temporarily turn the device on), the external reader 180 can accumulate a set of measurements (or other feedback) over time from the sensor electronics 160 without continuously powering the eye-mountable device 110.

Figure 2A:
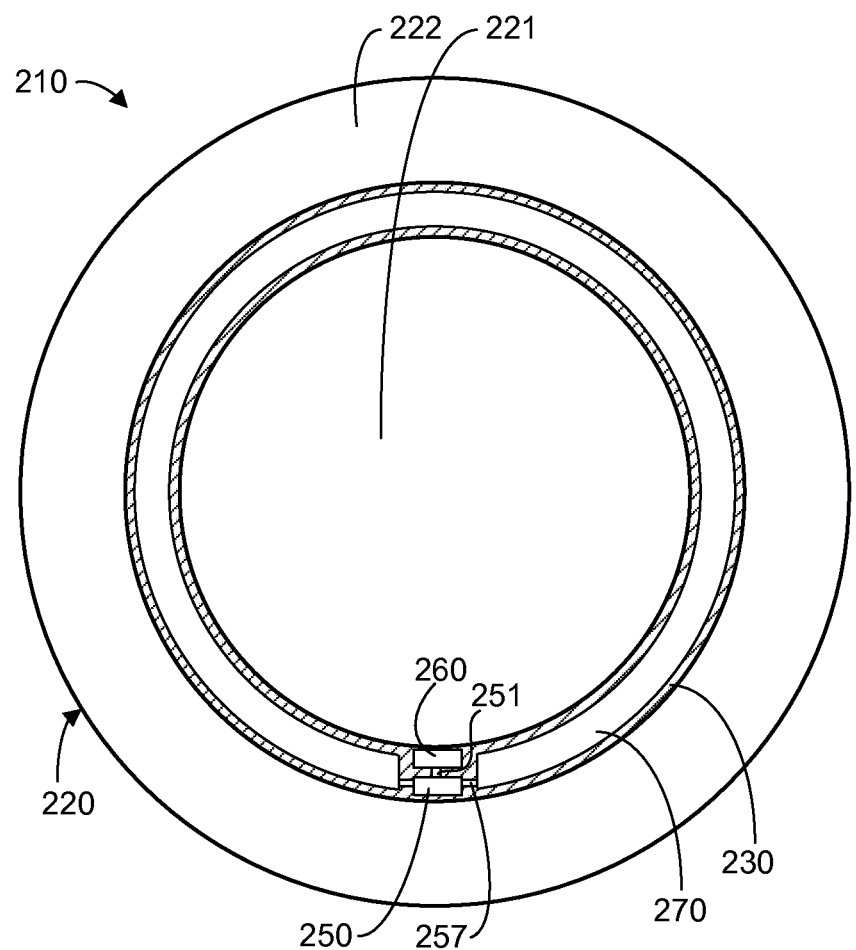
FIG. 2A is a top view of an example eye-mountable device.
Figure 2B:
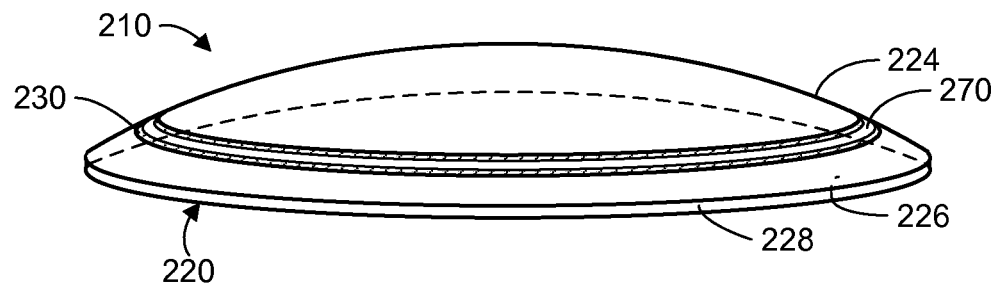
FIG. 2B is a side view of the example eye-mountable device shown in FIG. 2A.

FIG. 2A is a top view of an example eye-mountable electronic device 210 (or ophthalmic electronics platform). FIG. 2B is an aspect view of the example eye-mountable electronic device shown in FIG. 2A. It is noted that relative dimensions in FIGS. 2A and 2B are not necessarily to scale, but have been rendered for purposes of explanation only in describing the arrangement of the example eye-mountable electronic device 210. The eye-mountable device 210 is formed of a polymeric material 220 shaped as a curved disk. The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 220 can be formed with one side having a concave surface 226 suitable to fit over a corneal surface of an eye. The opposite side of the disk can have a convex surface 224 that does not interfere with eyelid motion while the eye-mountable device 210 is mounted to the eye. A circular outer side edge 228 connects the concave surface 224 and convex surface 226.

The eye-mountable device 210 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 210 can be selected according to the size and/or shape of the corneal surface of the wearer's eye and/or to accommodate one or more components embedded in the polymeric material 220.

The polymeric material 220 can be formed with a curved shape in a variety of ways. For example, techniques similar to those employed to form vision-correction contact lenses, such as heat molding, injection molding, spin casting, etc. can be employed to form the polymeric material 220. While the eye-mountable device 210 is mounted in an eye, the convex surface 224 faces outward to the ambient environment while the concave surface 226 faces inward, toward the corneal surface. The convex surface 224 can therefore be considered an outer, top surface of the eye-mountable device 210 whereas the concave surface 226 can be considered an inner, bottom surface. The "top" view shown in FIG. 2A is facing the convex surface 224 From the top view shown in FIG. 2A, the outer periphery 222, near the outer circumference of the curved disk is curved to extend into the page, whereas the central region 221, near the center of the disk is curved to extend out of the page.

A substrate 230 is embedded in the polymeric material 220. The substrate 230 can be embedded to be situated along the outer periphery 222 of the polymeric material 220, away from the central region 221. The substrate 230 does not interfere with vision because it is too close to the eye to be in focus and is positioned away from the central region 221 where incident light is transmitted to the eye-sensing portions of the eye. Moreover, the substrate 230 can be formed of a transparent material to further mitigate effects on visual perception.

The substrate 230 can be shaped as a flat, circular ring (e.g., a disk with a centered hole). The flat surface of the substrate 230 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 230 can be implemented in a variety of different form factors, similar to the discussion of the substrate 130 in connection with FIG. 1 above.

A loop antenna 270, controller 250, and sensor electronics 260 are disposed on the embedded substrate 230. The controller 250 can be a chip including logic elements configured to operate the sensor electronics 260 and the loop antenna 270. The controller 250 is electrically connected to the loop antenna 270 by interconnects 257 also situated on the substrate 230. Similarly, the controller 250 is electrically connected to the sensor electronics 260 by an interconnect 251. The interconnects 251, 257, the loop antenna 270, and any conductive electrodes (e.g., for an electrochemical analyte sensor, etc.) can be formed from conductive materials patterned on the substrate 230 by a process for precisely patterning such materials, such as deposition, photolithography, etc. The conductive materials patterned on the substrate 230 can be, for example, gold, platinum, palladium, titanium, carbon, aluminum, copper, silver, silver-chloride, conductors formed from noble materials, other metals, combinations of these, etc.

The loop antenna 270 is a layer of conductive material patterned along the flat surface of the substrate to form a flat conductive ring. In some examples, to allow additional flexibility along the curvature of the polymeric material, the loop antenna 270 can include multiple substantially concentric sections electrically joined together in parallel or in series. Each section can then flex independently along the concave/convex curvature of the eye-mountable device 210. In some examples, the loop antenna 270 can be formed without making a complete loop. For instances, the antenna 270 can have a cutout to allow room for the controller 250 and sensor electronics 260, as illustrated in FIG. 2A. However, the loop antenna 270 can also be arranged as a continuous strip of conductive material that wraps entirely around the flat surface of the substrate 230 one or more times. For example, a strip of conductive material with multiple windings can be patterned on the side of the substrate 230 opposite the controller 250 and sensor electronics 260. Interconnects between the ends of such a wound antenna (e.g., the antenna leads) can then be passed through the substrate 230 to the controller 250.

Figure 2D:
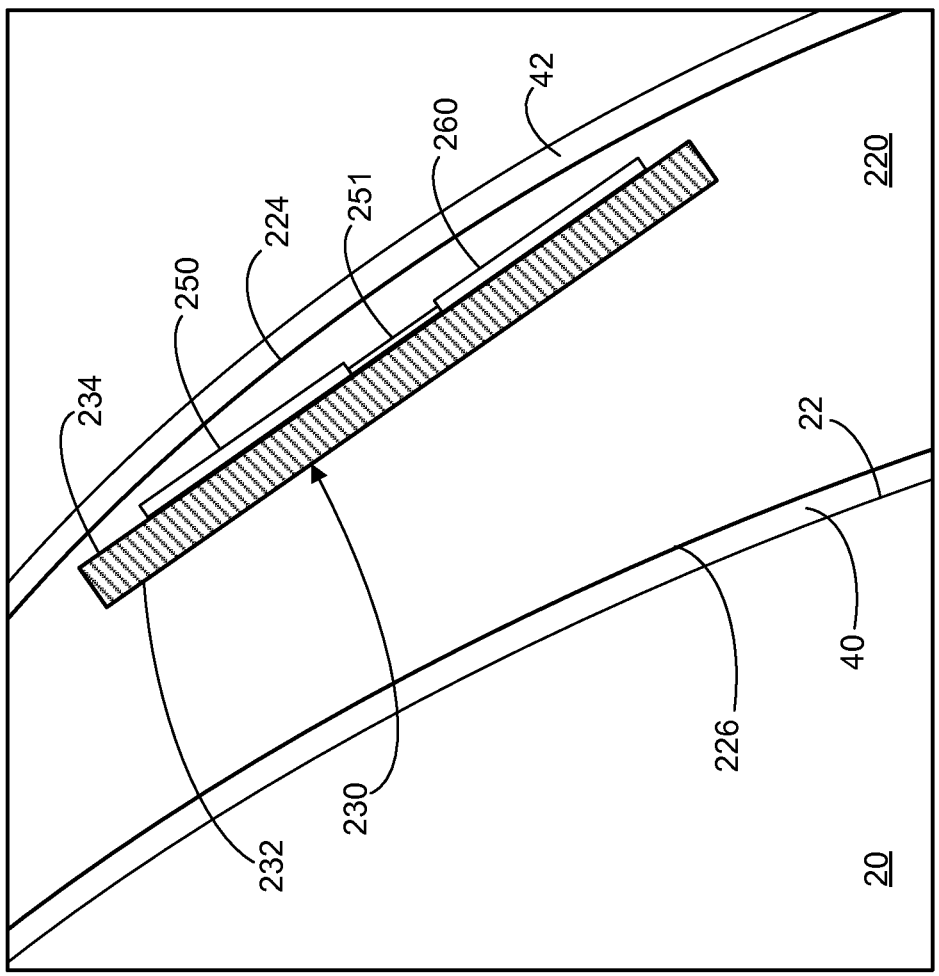
FIG. 2D is a side cross-section view enhanced to show the electronics on the example eye-mountable device when mounted as shown in FIG. 2C.
Figure 2C:
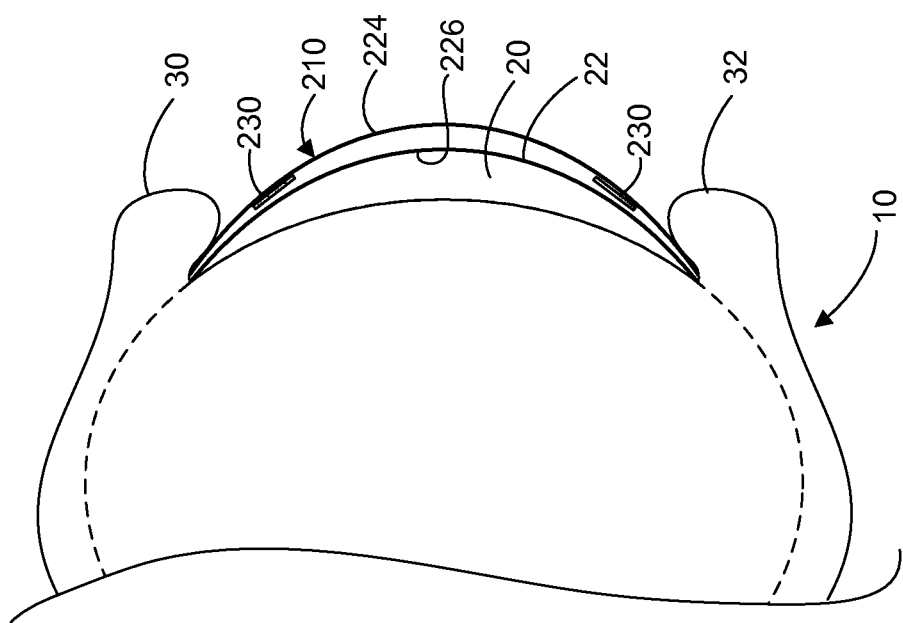
FIG. 2C is a side cross-section view of the example eye-mountable device shown in FIGS. 2A and 2B while mounted to a corneal surface of an eye.

FIG. 2C is a side cross-section view of the example eye-mountable device 210 while mounted to a corneal surface 22 of an eye 10. FIG. 2D is a close-in side cross-section view enhanced to show the sensor electronics 260 on the example eye-mountable device 210 when mounted as shown in FIG. 2C. As shown in FIG. 2D, while mounted to the corneal surface 22, tear film layers 40, 42 coat the concave surface 226 and convex surface 224. It is noted that the relative dimensions in FIGS. 2C and 2D are not necessarily to scale, but have been rendered for purposes of explanation only in describing the arrangement of the example eye-mountable electronic device 210. For example, the total thickness of the eye-mountable device can be about 200 micrometers, while the thickness of the tear film layers 40, 42 can each be about 10 micrometers, although this ratio may not be reflected in the drawings. Some aspects are exaggerated to allow for illustration and facilitate explanation.

The eye 10 includes a cornea 20 that is covered by bringing the upper eyelid 30 and lower eyelid 32 together over the top of the eye 10. Incident light is received by the eye 10 through the cornea 20, where light is optically directed to light sensing elements of the eye 10 (e.g., rods and cones, etc.) to stimulate visual perception. The motion of the eyelids 30, 32 distributes a tear film across the corneal surface 22 of the eye 10. The tear film is an aqueous solution secreted by the lacrimal gland to protect and lubricate the eye 10. When the eye-mountable device 210 is mounted in the eye 10, the tear film coats both the concave and convex surfaces 224, 226 with an inner layer 40 (along the concave surface 226) and an outer layer 42 (along the convex layer 224). The tear film layers 40, 42 can be about 10 micrometers in thickness and together account for about 10 microliters.

The tear film layers 40, 42 are distributed across the corneal surface 22 and/or the convex surface 224 by motion of the eyelids 30, 32. For example, the eyelids 30, 32 raise and lower, respectively, to spread a small volume of tear film across the corneal surface 22 and/or the convex surface 224 of the eye-mountable device 210. The tear film layer 40 on the corneal surface 22 also facilitates mounting the eye-mountable device 210 by capillary forces between the concave surface 226 and the corneal surface 22. In some embodiments, the eye-mountable device 210 can also be held over the eye in part by vacuum forces against corneal surface 22 due to the concave curvature of the eye-facing concave surface 226.

As shown in the cross-sectional views in FIGS. 2C and 2D, the substrate 230 can be inclined such that the flat mounting surfaces of the substrate 230 are approximately parallel to the adjacent portion of the concave surface 226. As described above, the substrate 230 is a flattened ring with an inward-facing surface 232 (closer to the concave surface 226 of the polymeric material 220) and an outward-facing surface 234 (closer to the convex surface 224). The substrate 230 can have electronic components and/or patterned conductive materials mounted to either or both mounting surfaces 232, 234. As shown in FIG. 2D, the sensor electronics 260, controller 250, and conductive interconnect 251 can be mounted on the outward-facing surface 234.

However, the sensor electronics module 260 and/or other electronics components may be mounted to a side of the substrate 230 facing the convex surface 224 and/or a side facing the concave surface 226. Thus, an image sensor may be mounted so to be facing the convex surface 224 (i.e., in an outward direction from the surface of the eye), which allows the image sensor to capture images corresponding to the field of vision of the eye. Or, an image sensor may be mounted on the substrate 230 to either the "inward" facing side 232 (e.g., situated closest to the concave surface 226) or the "outward" facing side 234 (e.g., situated closest to the convex surface 224). Moreover, in some embodiments, some electronic components can be mounted on one side of the substrate 230, while other electronic components are mounted to the opposing side, and connections between the two can be made through conductive materials passing through the substrate 230.

III. Example Ophthalmic Image Sensor

Figure 3:
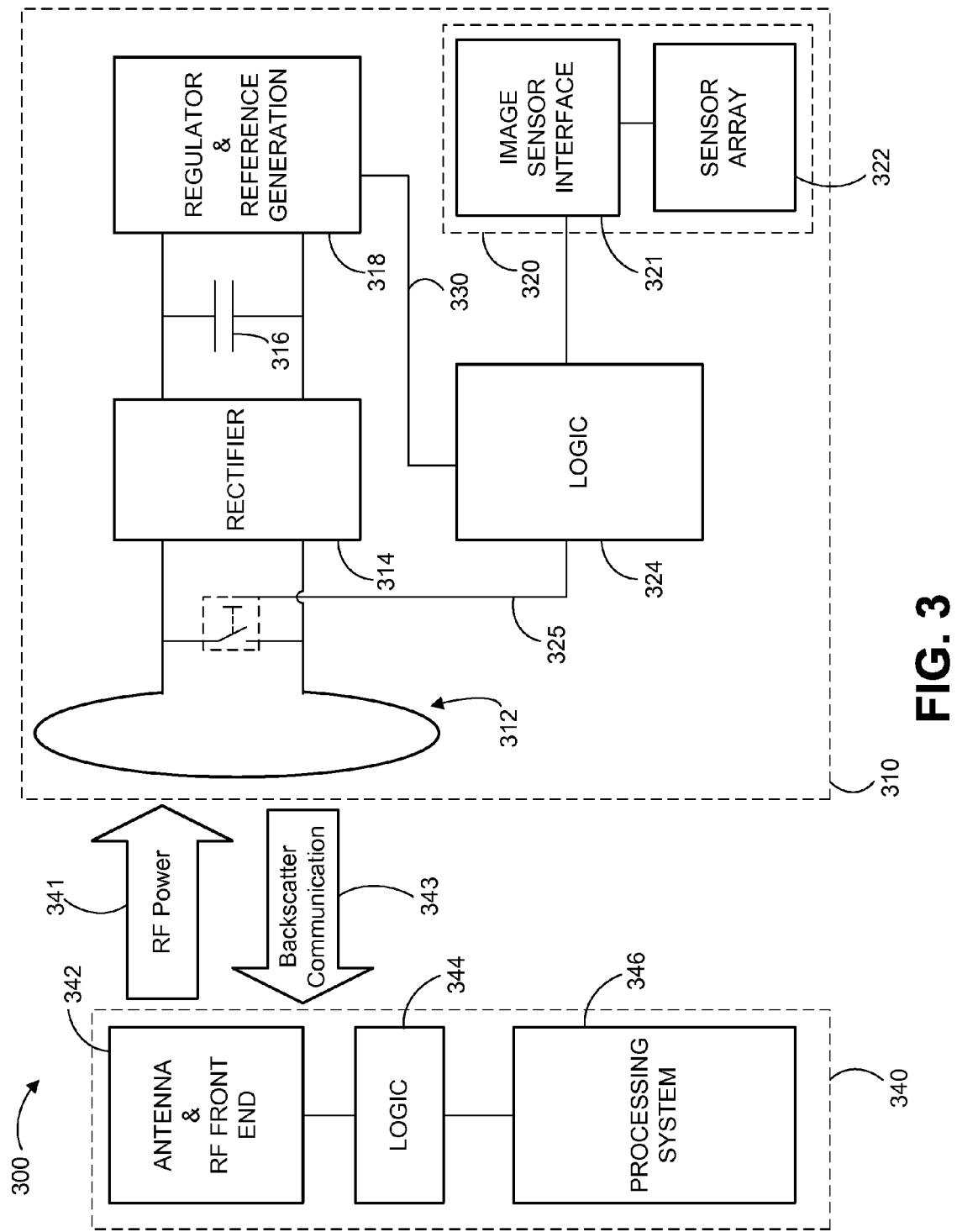
FIG. 3 is a functional block diagram of an example system configured to capture an image using an eye-mountable device.

FIG. 3 is a functional block diagram of a system 300 for capturing an image using an eye-mountable device. The system 300 includes an eye-mountable device 310 with embedded electronic components and an external reader 340. The eye-mountable device 310 includes an antenna 312 for capturing radio frequency radiation 341 from the external reader 340. The eye-mountable device 310 includes a rectifier 314, an energy storage 316, and regulator 318 for generating power supply voltages 330, 332 to operate the embedded electronics. The eye-mountable device 310 includes an image sensor 320 with a sensor array 322 driven by a sensor interface 321. The eye-mountable device 310 includes hardware logic 324 for communicating results from the image sensor 320 to the external reader 340 by modulating the impedance of the antenna 312. An impedance modulator 325 (shown symbolically as a switch in FIG. 3) can be used to modulate the antenna impedance according to instructions from the hardware logic 324.

Similar to the eye-mountable devices 110, 210 discussed above in connection with FIGS. 1 and 2, the eye-mountable device 310 can include a mounting substrate embedded within a polymeric material configured to be mounted to an eye. The image sensor 320 can be situated on a mounting surface of such a substrate (e.g., corresponding to the sensor electronics 260 on the outward-facing side 234 of the substrate 230) to measure light incident on the eye from the surrounding environment. The image sensor 320 can thereby be used to obtain images corresponding to a field of view of the eye. In some embodiments, however, an image sensor can be situated on a mounting surface of such a substrate proximate the surface of the eye (e.g., corresponding to the inward-facing side 232 of the substrate 230) to measure light reflected from the eye. As such, the image sensor 320 may be used to obtain an image of the eye itself.

With reference to FIG. 3, the image sensor 320 obtains images by exposing the sensor array 322 to incident light, and then using the image sensor interface 321 to read out values corresponding to the amount of light received across the sensor array 322. The sensor array 322 can include multiple photo-sensitive elements each configured to generate an electrical output signal based on the light received by each element. For example, the sensor array 322 can include a pixelated array, each of which can include a photodiode and one or more thin film transistors configured to output a voltage corresponding to light received during a given exposure interval. Such photo-sensitive arrays can be implemented using complementary metal oxide semiconductor (CMOS) technologies, charge coupled device (CCD) technologies, or other technologies including an array of pixelated photo-sensitive electronics.

In order for the pattern of incident light detected via the sensor array 322 to correspond to an image of the surrounding environment, the light incident on the sensor array 322 can be directed/routed such that light incident on different regions of the sensor array 322 (i.e., at different ones of the photo-sensitive elements) corresponds to light from different directions of the surrounding environment. Conventional camera systems may provide such direction selectivity using a primary lens that focuses incoming light onto a focal plane coincident with the photo-sensitive plane of a sensor array. By contrast, systems employed herein use multiple direction-selective light channels arranged to guide light from respective directions to each of the photo-sensitive elements in the sensor array 322. Each of the light channels is oriented to accept light (and convey that light to the sensor array 322) from a respective direction.

Incident light from a given direction passes through one or more of the light channels and illuminates the one or more of the photo-sensitive elements in the sensor array 322 arranged to receive light from those one or more light channels. As a result of such an arrangement, distinct regions of the sensor array 322 receive light from distinct directions in the surrounding environment. In some cases, the image sensor 320 can be configured such that each of the photo-sensitive elements is positioned to receive light from only a single, respective light channel. Moreover, each of the light channels may direct light to only a single, respective photo-sensitive element. Thus, there may be a one to one correspondence between light channels and photo-sensitive elements in the sensor array 322.

The light channels may be formed by patterning metal (or another opaque material that is readily manipulated by microfabrication techniques) in multiple layers over the sensor array 322. The layers of opaque material can be patterned such that each layer has an aperture for each of the photo-sensitive elements. The apertures in the multiple layers can be aligned with one another to define the light channels, and the opaque material can form sidewalls between the light channels. The sidewalls can prevent light that enters one channel from entering another light channel. In some cases, each light channel can have a cross-sectional area near the sensor array 322 that is comparable to a photo-sensitive area of a typical photo-sensitive element. However, the opening of each light channel away from the photo-sensitive element can have a wider cross-sectional area. For example, the diameters of the aperture and the photodiodes in each photo-sensitive element can be at least roughly equal, such as within about 50%. Examples of such light channels are described in connection with FIG. 5 below.

The rectifier 314, energy storage 316, and voltage regulator 318 operate to harvest energy from received radio frequency radiation 341. The radio frequency radiation 341 inductively generates radio frequency electrical signals on leads of the antenna 312. The rectifier 314 is connected to the antenna leads and converts the radio frequency electrical signals to a DC voltage. The energy storage 316 (e.g., capacitor) is connected across the output of the rectifier 314 to filter out high frequency components of the DC voltage. The regulator 318 receives the filtered DC voltage and outputs a digital supply voltage 330 to operate the hardware logic 324. The digital supply voltage 330 can be a voltage suitable for driving digital logic circuitry, such as approximately 1.2 volts, approximately 3 volts, etc. Reception of the radio frequency radiation 341 from the external reader 340 (or another source, such as ambient radiation, etc.) causes the supply voltage 330 to be supplied to the hardware logic 324. The supply voltage 330 can also power the image sensor 320 (e.g., by biasing the photodiodes, etc.) to cause the photo-sensitive elements in the sensor array 322 to begin responding to incident light. While powered, the image sensor 320 and hardware logic 324 are configured to operate in coordination so as to obtain an image of the surrounding environment by measuring incident light on the sensor array 322.

The sensor results can be communicated back to the external reader 340 via backscatter radiation 343 from the antenna 312. The hardware logic 324 receives the output current from the electrochemical sensor 320 and modulates (325) the impedance of the antenna 312 in accordance with the measurements from the image sensor 320. The antenna impedance and/or change in antenna impedance is detected by the external reader 340 via the backscatter signal 343. The external reader 340 can include an antenna front end 342 and logic components 344 to decode the information indicated by the backscatter signal 343 and provide digital inputs to a processing system 346. The external reader 340 associates the backscatter signal 343 with an image obtained using the image sensor 320 (e.g., via the processing system 346 according to a pre-programmed relationship associating impedance of the antenna 312 with output from the image sensor 320). The processing system 346 can then store the indicated sensor results (e.g., images) in a local memory and/or an external memory (e.g., by communicating through a network).

In some embodiments, one or more of the features shown as separate functional blocks can be implemented ("packaged") on a single chip. For example, the eye-mountable device 310 can be implemented with the rectifier 314, energy storage 316, voltage regulator 318, sensor interface 321, sensor array 322, and the hardware logic 324 packaged together in a single chip or controller module. Such a controller can have interconnects ("leads") connected to the loop antenna 312.

Figure 4A:
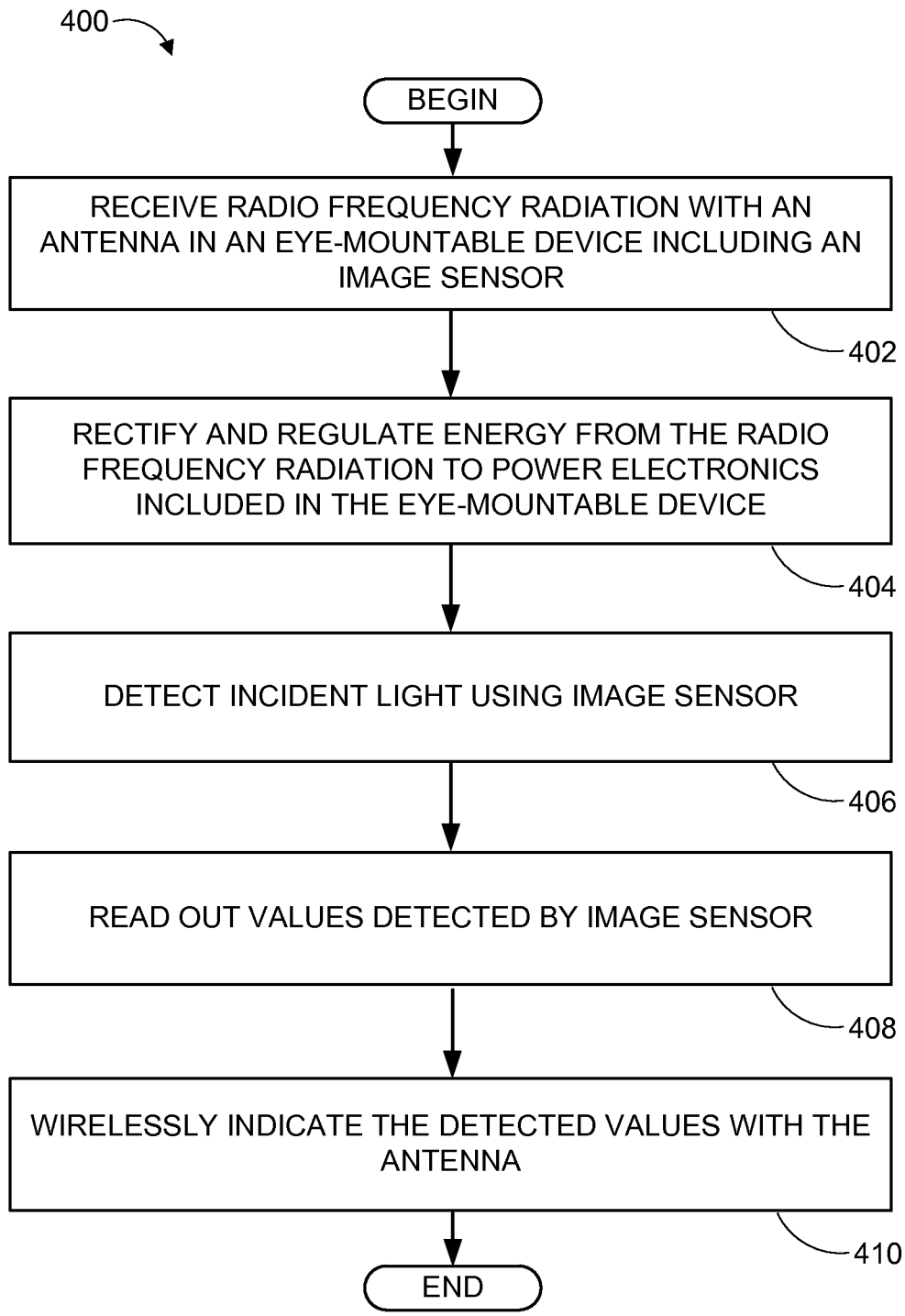
FIG. 4A is a flowchart of an example process for operating an image sensor in an eye-mountable device to capture an image.

FIG. 4A is a flowchart of a process 400 for operating an image sensor in an eye-mountable device to obtain an image. Radio frequency radiation is received at an antenna in an eye-mountable device including an integrated image sensor (402). Electrical signals due to the received radiation are rectified and regulated to power the image sensor and associated controller (404). For example, a rectifier and/or regulator can be connected to the antenna leads to output a DC supply voltage for powering one or more of the image sensor and/or other electronics. The image sensor detects incident light to allow the image sensor to detect an image of the surrounding environment (406). The image sensor may be arranged such that individual photo-sensitive elements in the sensor array receive light from a respective direction. For example, multiple light channels with respective orientations can be arranged to direct incident light to respective ones of the photo-sensitive elements in the sensor array. In some examples, the image sensor may be exposed to incident light via an integrated shutter device to control the timing and duration in which the image sensor array is exposed to incident light. However, the image detection operation can optionally be electronically controlled without a shutter mechanism (e.g., by activating and deactivating the image sensor to detect incident light). Values across the image sensor array are read out (e.g., measured) using read out electronics (408). For example, TFTs associated with photodiodes in each photo-sensitive element can be used to read a voltage value indicative of the light incident on the photo-sensitive element during the exposure interval. In some embodiments, the measured values can be read out as 10 bit values, although other examples may also be used, such as 8 bit values. The detected voltage values can then be wirelessly indicated with the antenna (410). For example, backscatter radiation can be manipulated to indicate the image sensor measurements by modulating the antenna impedance.

Figure 4B:
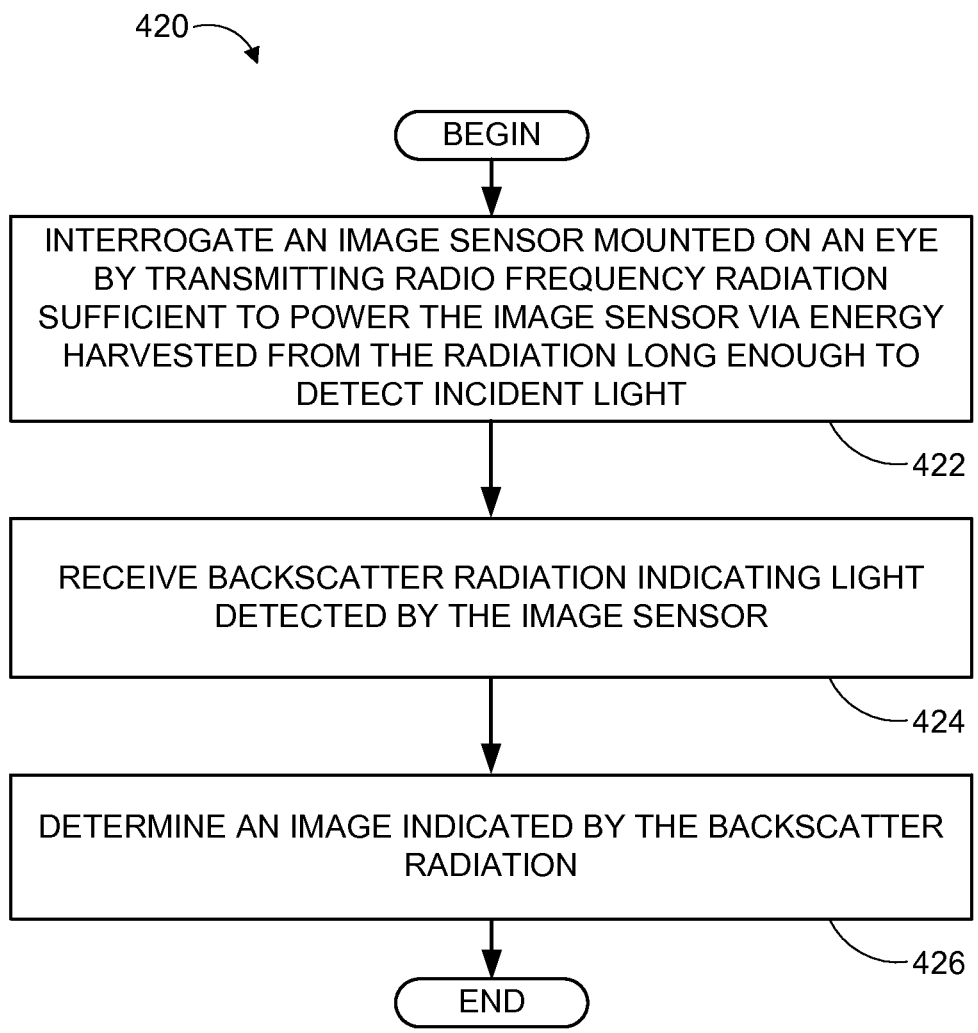
FIG. 4B is a flowchart of an example process for operating an external reader to interrogate an image sensor in an eye-mountable device to capture an image.

FIG. 4B is a flowchart of a process 420 for operating an external reader to interrogate an image sensor in an eye-mountable device to obtain an image sensor reading. Radio frequency radiation sufficient to power an image sensor via harvested energy is transmitted to an image sensor included in an eye-mountable device (422). For example, the radio frequency radiation used to power the image sensor can be similar to the radiation 341 transmitted from the external reader 340 to the eye-mountable device 310 described in connection with FIG. 3 above. The external reader then receives backscatter radiation indicating the measurement by the image sensor (424). For example, the backscatter radiation can be similar to the backscatter signals 343 sent from the eye-mountable device 310 to the external reader 340 described in connection with FIG. 3 above. The backscatter radiation received at the external reader is then used to determine an image (426). In some cases, the data indicative of the determined image can be stored in the external reader memory (e.g., in the processing system 346) and/or a network-connected data storage.

For example, the detected image sensor values can be encoded in the backscatter radiation by modulating the impedance of the backscattering antenna. The external reader can detect the antenna impedance and/or change in antenna impedance based on a frequency, amplitude, and/or phase shift in the backscatter radiation. The sensor values can then be extracted by associating the impedance value with the sensor result by reversing the encoding routine employed within the eye-mountable device. Thus, the reader can map a detected antenna impedance value to an image sensor value (e.g., a measure of light received at one or more elements of the sensor array 322). The sensor values can then be used to determine an image by combining such values from across the sensor array 322. For example, the sensor values from different photo-sensitive elements can be associated with a given direction, which may be based on pre-configured information related to the arrangement of direction-selective light channels in the image sensor and/or calibration information. Calibration information may be applied to adjust for direction-dependence as well as other factors, and may be empirically derived, for example.

IV. Direction-Selective Light Channels

Figure 5A:
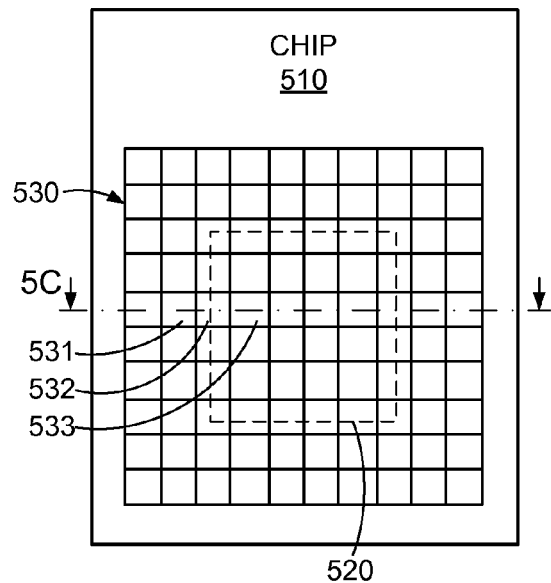
FIG. 5A is a top view of an example chip with an integrated camera detecting light via multiple light channels.
Figure 5B:
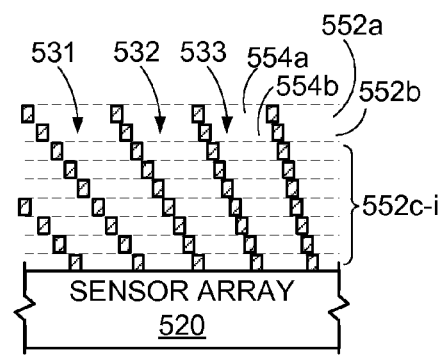
FIG. 5B is a side cross-section view of the example chip shown in FIG. 5A.
Figure 5C:
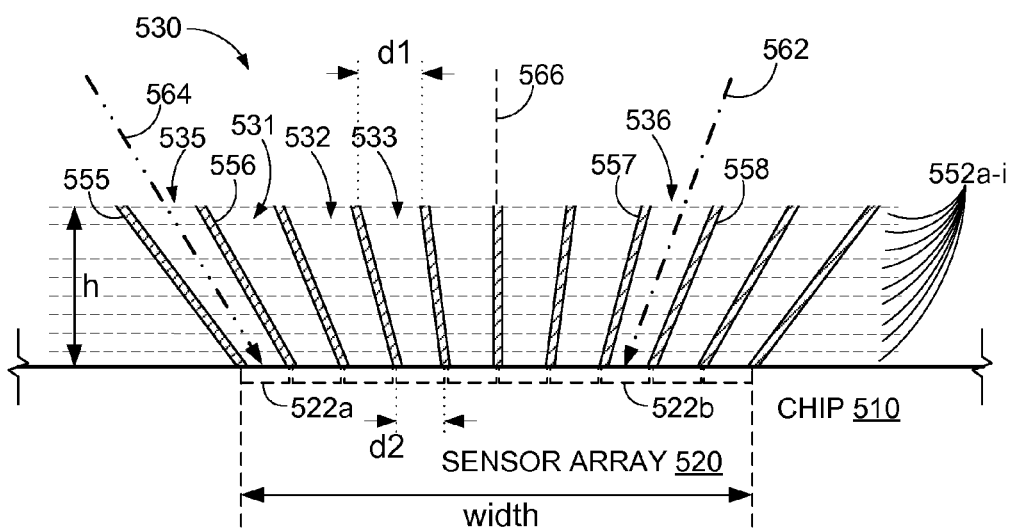
FIG. 5C is a side cross-section view of one example arrangement of light channels.

FIG. 5A is a top view of an example chip with an integrated camera configured to detect light via multiple light channels. FIG. 5B is a side cross-section view of a portion of the example chip shown in FIG. 5A. FIG. 5C is a side cross-section view of one example arrangement of light channels. The chip 510 can be mounted on a substrate incorporated in an eye-mountable device, such as the substrate 230 in the eye-mountable device 210. The chip 510 can include an integrated photo-sensitive array 520. The integrated photo-sensitive area could be, for example, a silicon layer with a pattern of photo-sensitive elements (e.g., photodiodes) and associated driving circuits (e.g., TFTs) for readout/reset.

The photo-sensitive array 520 is situated to receive incident light through direction-selective light channels 530. The light channels 530 can be formed of multiple layers of metal or another opaque material, such as a polymeric material, for example. The opaque material can be patterned over the sensor array 520 in multiple stacked layers 552a-i each situated substantially parallel to the plane of the sensor array 520. Each layer of the opaque material can have a pattern of apertures. The apertures then selectively allow passage of incident light to the sensor array 520. The layers are arranged such that the apertures are aligned with one another and combine to form the light channels 530. Particular regions of the image sensor 520 then receive light via particular ones of the light channels 530. Moreover, each of the light channels 530 can have a different orientation such that each light channel conveys light to the image sensor 520 from a respective direction while substantially blocking and/or reflecting light from other directions. The light channels 530 can thereby sensitize particular regions of the image sensor array 520 to light from respective directions. In some examples, the light channels 530 may be arranged such that each photo-sensitive element in the sensor array 520 receives light from exactly one light channel. Thus, each photo-sensitive element in the sensor array 520 may receive light from a given direction, which direction is based on the direction-dependence of the light channel conveying light to that photo-sensitive element. The direction-dependence of the light received (and measured) by different each photo-sensitive elements across the sensor array 520 can then be used to generate an image of the surrounding environment.

As shown in FIG. 5B, the light channels 530 may include multiple stacked layers of patterned opaque materials. In this example, there are 9 layers 552a-i of opaque material stacked to form the light channels 530 in FIGS. 5B and 5C; this number of layers is given for purposes of illustration only, as a greater or fewer number of layers may be used in other implementations. In FIG. 5B, the example pattern of opaque material shows a cross-section view of 3 light channels 531, 532, 533 formed by aligned apertures in the opaque material in layers 552a-i. For example, the light channel 533 is formed by an aperture 554a in the top layer 552a, an aperture 554b in the eighth layer 552b, and aligned apertures in the layers 552c-i.

The light channels 530 may have a generally conical shape with the channel being broader at the top where light enters, furthest from the sensor array 520, and narrower at the bottom, immediately over the sensor array 520. The conical shape provides a desired range of acceptance angles (e.g., each light channel may have an effective field of view that spans about 2 to 2.5 degrees). The shape of the channels 530 can be formed by incrementally adjusting the sizes in the aligned apertures in the layers 552a-i. For example, in the light channel 533 the aperture 554a in the top layer 552a may have a diameter of approximately 3 micrometers and the aperture in the first layer 552i may have a diameter of approximately 2 micrometers, and the apertures in the intervening layers may range between the two so as to create substantially smooth sidewalls along the interior of the light channel 533.

The sidewalls formed by the opaque material in the stacked layers 552a-i may be patterned by a microfabrication technique such as a photolithography or the like. In some examples, each layer may have a thickness of about 0.1 micrometers to about 0.5 micrometers.

The three light channels 531, 532, 533 formed by the patterned layers 552a-i have different orientations and therefore pass light to the sensor array 520 that arrives from different directions. Generally, the combination of light channels 530 may cumulatively span a field of view of the imaging system. The field of view may be defined by the full range of angles of incident light that is able to pass through at least one of the light channels 530 to be detected by the sensor array 520. The nominal angle of incident light that is transmitted through a given light channel may be referred to herein as an acceptance angle for that light channel, although in practice each light channel may accept incident light over a range of angles, such as a solid angle with a 2 degree to 2.5 degree one-dimensional span.

The full solid angle of the full field of view may be subdivided amongst each of the light channels 530 to provide full directional coverage of the field of view. The patterns of apertures in the layers 552a-i can then be arranged accordingly to create light channels with the desired acceptance angles. Light channels near the center of the sensor array 520 may have an angle of acceptance that is approximately centered in the full field of view of the imaging system, and light channels near the periphery of the sensor array 520 have acceptance angles along the outer boundaries of the full field of view. In some cases, the acceptance angles of the centrally located light channels may correspond to incident light that is substantially normal to the plane of the sensor array 520, although other implementations are possible.

In the example embodiment illustrated in FIGS. 5B and 5C, the light channels 531, 532, 533 are adjacent to one another. Light channel 531 is relatively closer to the periphery, light channel 533 is relatively closer to the center point of the sensor array 520, and light channel 532 is situated between the two. The acceptance angle of light channel 533 is relatively closer to the normal direction (of the plane of the sensor array 520) than the light channel 531, which is apparent in FIG. 5B from the variation in slope of the sidewalls formed by the layers 552*a-i*.

As shown in FIG. 5C, light rays 562, 564 are incident on the imaging system from distinct directions. In particular, the two light rays 562, 564 are oriented at different angles with respect to a central optical axis 566 that is approximately normal to the plane of the sensor array 520. The light ray 564 can be oriented at a greater angle with respect to the central optical axis 566 than the light ray 562. The light ray 564 enters the light channel 535, which has an acceptance angle corresponding to the arrival angle of the light ray 564. The light ray 564 passes through the light channel 535 and illuminates a region 522*a* of the sensor array 520 (e.g., a photo-sensitive pixel). Similarly, the light ray 562 enters the light channel 536 from an arrival angle corresponding to the acceptance angle of light channel 536. The light ray 562 passes through the light channel 536 and illuminates another region 522*b* of the sensor array 520 (e.g., another pixel).

The light channel 535 is defined by sidewalls 555, 556, which are themselves formed by aligned apertures patterned in the layers 552*a-i* of opaque material stacked over the sensor array 520. The light channel 536 is defined by sidewalls 557, 558, which are formed by additional aligned apertures patterned in the layers 552*a-i* of opaque material. The acceptance angles (or ranges of angles) of the two light channels 535, 536 are approximately defined by the orientation of the respective sidewalls 555, 556 and 557, 558. As illustrated in FIG. 5C, the light ray 564 is approximately parallel to the sidewalls 555, 556 and the light ray 562 is approximately parallel to the sidewalls 557, 558. That is, incident light is able to successfully pass through a given light channel if it is oriented along a direction that is substantially parallel to the sidewalls of that light channel.

In addition to forming the light channels 530, the stacked layers 552*a-i* may be used, at least in part, to pattern conductive and/or semiconductive materials used to form TFTs, interconnects, row/column lines, or other readout/driving circuitry related to the sensor array 520. The total height h of the stacked layers 552*a-i* may be about 10 micrometers. The layered circuit components in the layers 552*a-i* (and/or in further layers not shown) can optionally include a plurality of conductive layers (e.g., including readout lines, etc.) in layers closest to the image sensor array 540 (e.g., layer 552*i*). In some cases at least some of the layers 550*a-i* include substantially transparent materials within the light transmitting regions of the light channels 530 to permit incident light 562-564 to reach the sensor array 520. For example, the layers 550*a-i* may include dielectric materials such as silicon dioxide, conductive materials such as indium tin oxide, and/or other examples of at least partially transparent materials. In some examples, opaque conductive materials such as copper and/or aluminum can be patterned so as to form the sidewalls of the light channels (e.g., the sidewalls 555, 556, 557, 558, etc.).

The sensor array 520 and corresponding 530 is illustrated in FIGS. 5A-5C for example purposes as a 10 by 10 array of light channels and corresponding pixels. However, other implementations may have a greater or fewer numbers of pixels and/or light channels and may or may not have a one to one correspondence between pixels and light channels. For instance, the sensor array may be a 20 by 20 pixel array, and a 20 by 20 arrangement of 400 light channels may be situated over the sensor array to convey light from respective directions to each of the pixels in such a sensor array. The sensor array may have a pixel dimension of about 2 micrometers by 2 micrometers, and the light channels may have corresponding apertures for each pixel in a lowest layer of about 2 micrometers (e.g., the diameter d2), and then broaden to about 3 micrometers in a topmost layer (e.g., the diameter d1 of the light channel 533), such that each light channel has a generally conical shape. Of course, other implementations are also possible, such as examples in which the image sensor 520 has a width in a range from about 30 micrometers to about 200 micrometers.

As noted above, the sensor array 520 can include multiple photo-sensitive elements, which can be arranged in rows and columns across the sensor array 520 such that light illuminating different regions of the sensor array 520 can be distinguished. For example, one or more such photo-sensitive elements near the region 522*a* can be illuminated by the light ray 564 and one or more photo-sensitive elements near the region 522*b* can be illuminated by light ray 562. Reading out indications of the received intensity from each pixel in the sensor array 520 thereby provides an indication of the amount of light received from different directions, which can then be used to determine an image representing the scene.

The resolution of the imaging system (i.e., the ability to distinguish light from different directions) is dependent on both the density of photo-sensitive elements in the sensor array 540 and the selectivity of the acceptance angles of individual light channels 530. Generally, the individual light channels may have acceptance angles with ranges of about 2 degrees to about 2.5 degrees, although other examples are possible. In general, increasing the number of light channels (and corresponding image sensor pixels) may allow for enhancing the resolution. In addition, decreasing the range of angles accepted by each light channel may enhance resolution, although perhaps at a cost to total light received. In practice, the resolution of the imaging system may be limited by tradeoffs related to the physical size of the sensor array 520, the space available in the eye-mountable device, the physical thickness and structural integrity of the patterned opaque material, and other factors.

Figure 5D:
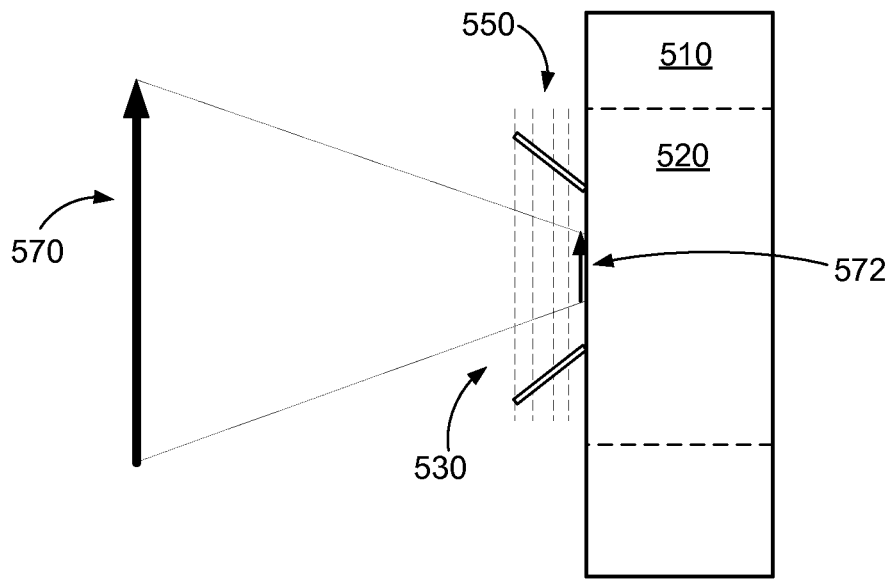
FIG. 5D is a side view illustrating imaging an object according to an example embodiment.

FIG. 5D is a side view illustrating imaging an object 570 according to an example embodiment. The arrangement of the imaging system in FIG. 5D is similar to the arrangement described in FIGS. 5A-5C. The sensor array 520 receives light through multiple direction-selective light channels formed by aligned apertures in multiple layers 550 of opaque material over the sensor array 520. Light indicative of the object 570 passes through multiples ones of the light channels to corresponding photo-sensitive elements in the sensor array 520. In particular, different photo-sensitive elements in the sensor array 520 receive light from different portions of the object 570, depending on the direction of arrival of the light from each portion. The received light from the portions of the object 570 combine at the sensor array 520 to form an imaged representation 572 of the object 570, based on measurements at the sensor array 520. The imaging system is able to obtain an image of the object 570 even without using any focusing optics, such as lenses, etc. by employing the direction-selective light channels 530 to cause the light reaching the sensor array 520 to have direction-dependence.

Figure 5E:
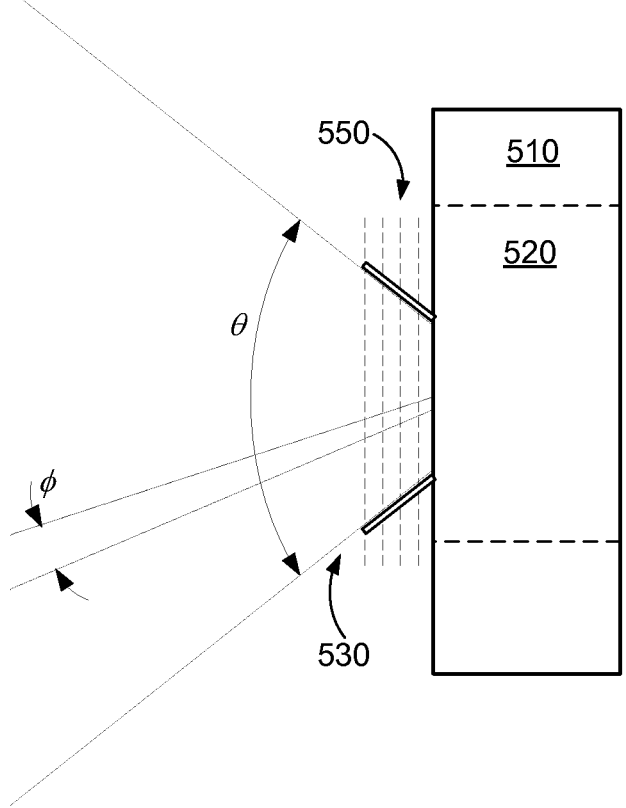
FIG. 5E is a side view illustrating a field of view according to an example embodiment.

FIG. 5E is a side view illustrating a field of view according to an example embodiment. The arrangement of the imaging system in FIG. 5D is similar to the arrangement described in FIGS. 5A-5C. The imaging system has a field of view defined by the acceptance angles cumulatively spanned by its multiple light channels 530. The full field of view may span, in one-dimension, an angle θ, which may be the angle separating the acceptance angles of light channels at opposing ends of the sensor array 520. Depending on the implementation, the angle θ may take a range of values such as about 40 degrees to about 120 degrees, and perhaps as much as 180 degrees. The field of view θ can include an approximately conical region symmetric about the central optical axis (i.e., normal to the sensor array 520) and with sides approximately parallel to the sidewalls of the outermost light channels in the arrangement of light channels 530. FIG. 5E also illustrates an acceptance angle range φ for a single light channel. The angle φ of the example acceptance angle may have a one-dimensional span between about 1 degree and 5 degrees, in various embodiments. In some cases, the angle φ may be between about 2 degrees and about 2.5 degrees. In some cases, the light channels may be arranged such that adjacent light channels have substantially adjacent, non-overlapping ranges of acceptance angles such that the full field of view θ is spanned by the acceptance angles of the individual light channels, yet acceptance angle ranges of individual light channels do not overlap with one another.

The arrangement in FIGS. 5D and 5E is referred to as a front side illumination imaging system because the light is incident on the sensor array 520 from the side of the sensor array 520 that includes stacked circuitry components 552*a-i* for read out and/or driving circuits operating the photo-sensitive elements (e.g., photodiodes) in the sensor array 520. The side with the stacked circuit components (e.g., the conductive layer) is therefore generally referred to as the "front side" during assembly of the chip 510.

In some cases, determining an image using the imaging systems described herein may involve correlating light measurements from photo-sensitive elements in separate regions of the sensor array 520 receiving light from a substantially common direction. For example, a single light channel may convey light to multiple pixels or individual light channels may have overlapping, non-distinct acceptance angles. Image determination routines may employ a variety of different techniques to combine measurements of received light across the sensor array 520 from more than one aperture in potentially overlapping patterns to estimate direction(s) associated with various light measurements, and then use the estimated direction(s) to form an image of the surrounding environment. In some cases, calibration routines may be employed using images of standard patterns to identify characteristics of the direction selectivity of the light channels 530, and data from such calibration can then be used to generate images.

The sensor arrays described can include multiple photo-sensitive elements and associated circuit components (e.g., TFTs, etc.) to drive the photo-sensitive elements. For example, a photodiode in a given photo-sensitive element can be operated to read out voltage values indicative of an amount of received light, and the photodiode may also be reset to clear residual accumulated charge between successive image capture events. By reading out values from the individual photo-sensitive elements, the amount of light measured at various locations across the sensor array can be determined, and an image representing the surrounding environment can then be determined.

In some examples, the light measured at each photo-sensitive element can be represented by data indicative of the amount of light received during a particular exposure event. For example, measurement data may include 8 bit data values, 10 bit data values, etc. depending on the sensitivity and/or gradation of the particular photodiodes and other circuit components employed.

In some examples, the image sensor array may have uniform sized photo-sensitive elements arranged in rows and columns. As shown in FIG. 5A, the sensor array 520 has "n" rows and "m" columns. The "n" by "m" array can be square, such as an array with dimensions of 128 by 128, 64 by 64, 20 by 20, etc. Alternatively, the array may be non-square, such as an array with dimensions in a 3:2 ratio, 16:9 ratio, etc. Other arrangements of photo-sensitive elements are possible as well.

V. Example Operations

Figure 6A:
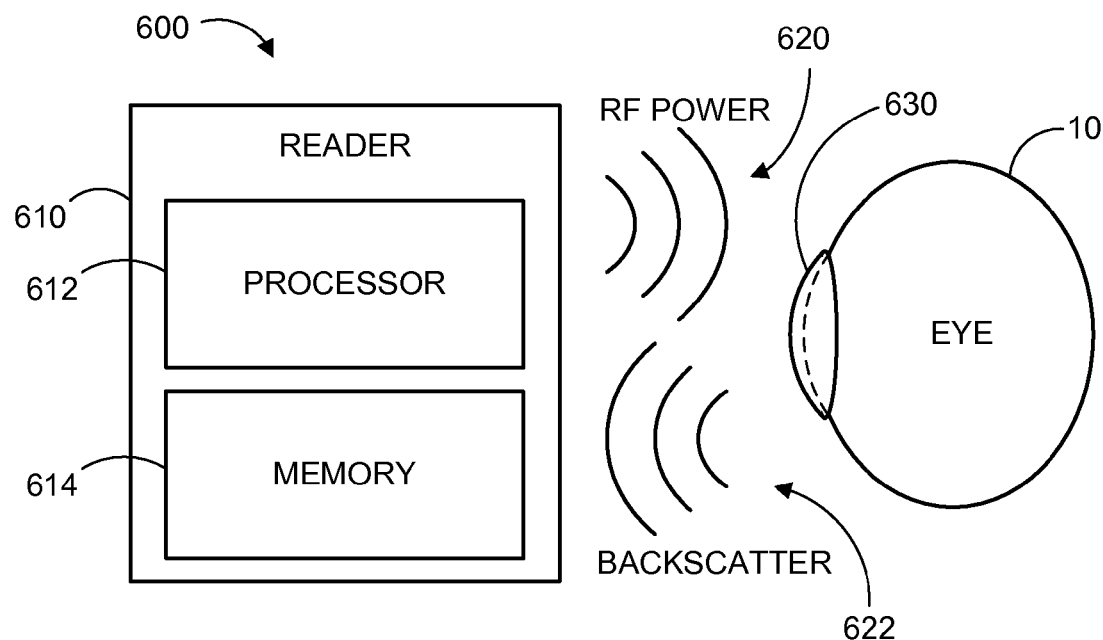
FIG. 6A is a block diagram of an ophthalmic image sensor system operated by an external reader to obtain a series of images over time.

FIG. 6A is a block diagram of a system 600 with an ophthalmic image sensor system 630 operated by an external reader 610 to obtain one or more images from the image sensor. The ophthalmic image sensor 630 is included in an eye-mountable device configured to be contact-mounted over a corneal surface of an eye 10. The ophthalmic image sensor 630 can be operated to measure light received at a photo-sensitive sensor array that enters direction-selective light channels, similar to any of the image sensor systems described herein in connection with FIGS. 1-5.

The external reader 610 includes a processing system 612 and a memory 614. The processing system 612 can be a computing system that executes software stored in the memory 614 to cause the system 600 to operate as described herein to obtain one or more image measurements (e.g., by intermittently transmitting a signal to power the ophthalmic image sensor 630 to obtain a measurement of received light and communicate the results as shown in connection with FIGS. 1-5). The external reader 610 can also include an antenna (not shown) for transmitting radio frequency radiation 620 to be harvested by the ophthalmic image sensor 630. The external reader 610 can also receive indications of sensor results 622 transmitted back to the reader by backscatter radiation. For example, the antenna impedance of the ophthalmic electrochemical sensor 630 can be modulated in accordance with the sensor measurement such that the backscatter radiation 622 indicates the sensor measurement.

Once indications of the measured light are received, the external reader 610 can then perform operations to determine an image indicated by the measurements of light received across the sensor array of the ophthalmic image sensor 630. For example, the processing system 612 can execute instructions stored in the memory 614 to associate each light measurement (e.g., brightness value) with a particular direction (e.g., based on direction-selectivity of light channels that pass light to respective photo-sensitive elements in the sensor array). An image of the surrounding environment can then be formed by combining the various light measurements in accordance with their associated directions. The processing system 612 can also execute one or more smoothing, filtering, and/or other image processing routines, and can apply various compensation and/or calibration routines to account for variations among particular photo-sensitive elements (e.g., photodiode variations, TFT variations, etc.) and/or variations across the sensor array (e.g., temperature-based variations, etc.). The external reader 610 can also use the memory 614 to store indications of the resulting images, once determined. The external reader 610 can thus be operated to intermittently power the ophthalmic image sensor 630 so as to obtain a time series of images, such as to construct a video from the subsequently captured images. In some cases, images can be transmitted at a rate of approximately one frame per second, however other rates are possible. In particular, even without adjusting bandwidth constraints in the communication link between the reader 610 and the ophthalmic image sensor 630, enhanced continuous frame rates may be achieved by using an image sensor array with fewer photo-sensitive elements (and thus transmit fewer light measurements) or that measure received light with less precision (and thus transmit fewer bits per light measurement).

Figure 6B:
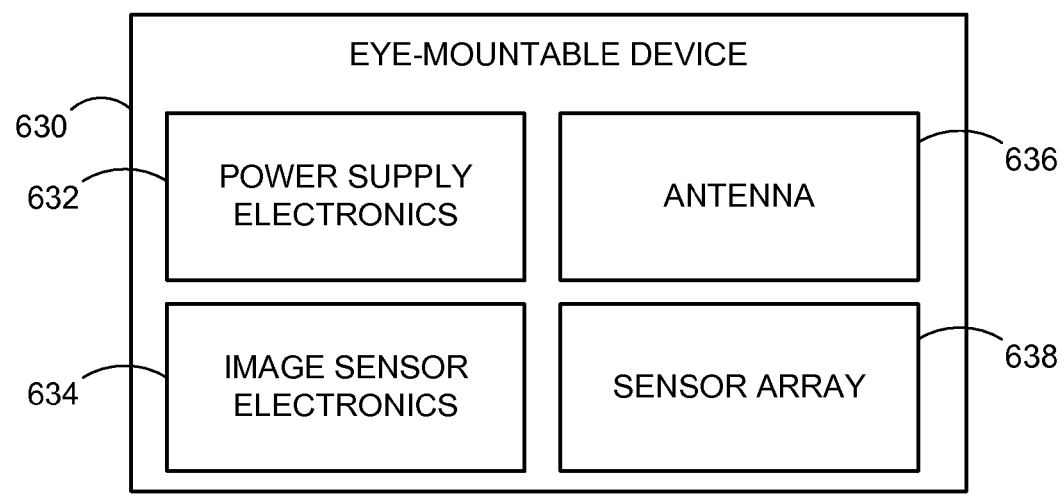
FIG. 6B is a block diagram of the ophthalmic image sensor system described in connection with FIG. 6A.

FIG. 6B is a block diagram of the ophthalmic image sensor 630 described in connection with FIG. 6A. The ophthalmic image sensor 630 can be configured to operate similar to the eye-mountable image capture systems described in connection with FIGS. 1-5 above. Thus, the ophthalmic image sensor 630 can include energy harvesting systems 632 for harvesting energy from incident radiation (and/or other sources) to power image sensor electronics 634. For example, energy from incident radio frequency radiation can be harvested using an antenna 636. Once powered, the image sensor electronics 634 can operate the sensor array 638 to measure light received across the sensor array 638 that enters one or more light channels. Once measurements are obtained across the sensor array 638, the image sensor electronics 634 can read out the measurements of received light (e.g., by circuits configured to read accumulated voltages on photodiodes in each photo-sensitive element). The measurements of received light can then be wirelessly communicated back to the reader 610 using the antenna 636. For example, the impedance of the antenna 636 can be modulated to characteristically adjust the frequency, phase, and/or amplitude of the backscatter radiation 622 in a manner that can be demodulated by the reader 610.

Moreover, it is particularly noted that while the electronics platform is described herein by way of example as an eye-mountable device or an ophthalmic device, it is noted that the disclosed systems and techniques for small form factor imaging systems can be applied in other contexts as well. For example, contexts in which electronics platforms are operated with low power budgets (e.g., via harvested energy from radiated sources) or are constrained to small form factors (e.g., implantable bio-sensors or other wearable electronics platforms) may employ the systems and processes described herein to capture images of a surrounding environment. In one example, an implantable medical device that includes an image sensor may be encapsulated in biocompatible material and implanted within a host organism. The implantable medical device may include a circuit configured to detect light received by a photo-sensitive sensor array through direction-selective light channels and communicate indications of detected light. Reading and/or control devices can communicate with the implantable medical device to determine the light measured across the array and then use the measurements to determine an image corresponding to the detected light. The configurations disclosed herein that are free of focusing optics, and therefore enable imaging in small form factor applications and simultaneously can address power budget constraints in low power applications by operating via harvested energy.

Figure 7:
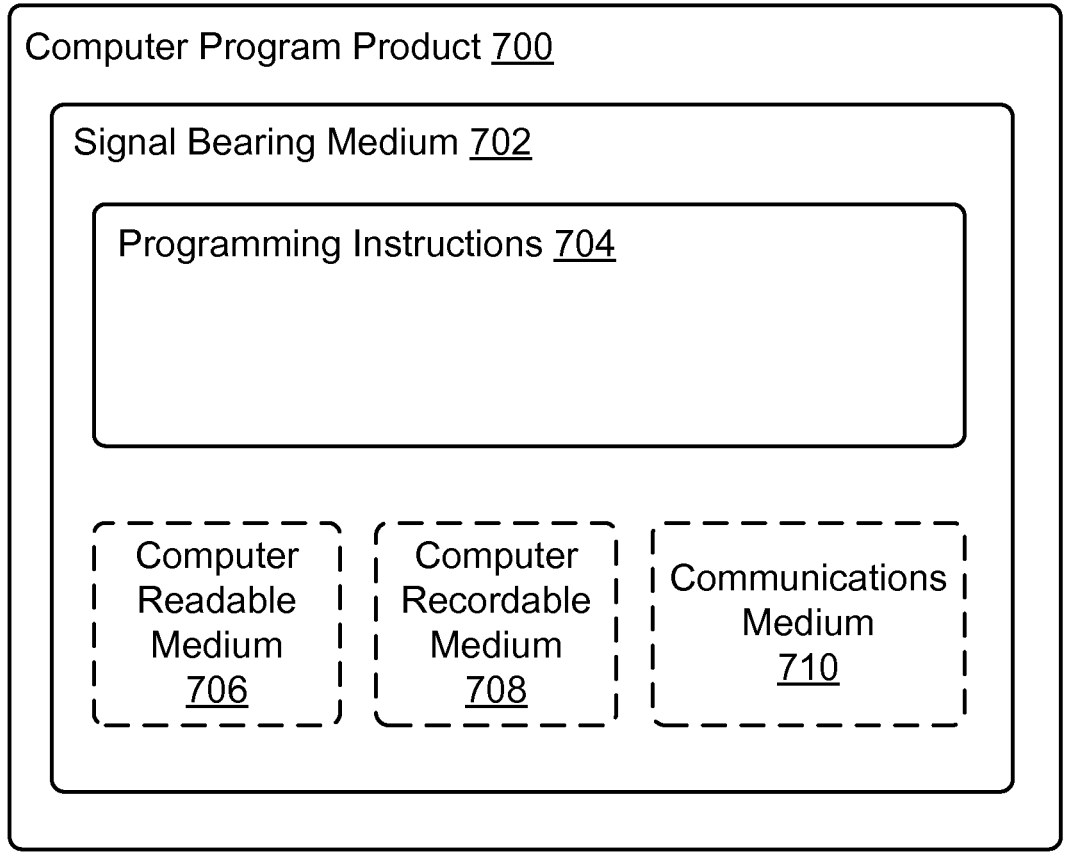
FIG. 7 depicts a computer-readable medium configured according to an example embodiment.

FIG. 7 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 184 stored on the memory storage 182 of the external reader 180 of the system 100, or in the memory 614 of the reader 600). FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a non-transitory computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor-equipped external reader 180 of FIG. 1 is configured to provide various operations, functions, or actions in response to the programming instructions 704 conveyed to the computing device by one or more of the computer readable medium 706, the computer recordable medium 708, and/or the communications medium 710.

The non-transitory computer readable medium 706 can also be distributed among multiple data storage elements, which could be remotely located from each other. The computing device that executes some or all of the stored instructions could be an external reader, such as the reader 180 illustrated in FIG. 1, or another mobile computing platform, such as a smartphone, tablet device, personal computer, etc. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An eye-mountable device comprising:
   a polymeric material that can be removably mounted over an eye;
   a substrate at least partially embedded in the polymeric material; and
   an image sensor disposed on the substrate, wherein the image sensor includes: a plurality of photo-sensitive elements in one-to-one correspondence with a plurality of light channels, wherein the plurality of light channels have a plurality of different orientations with respect to a central optical axis such that each photo-sensitive element receives incident light from a respective direction defined by a corresponding one of the plurality of light channels, and wherein each light channel has a first end through which incident light enters the light channel and a second end that is closer to the central optical axis through which light passes from the light channel to a corresponding one of the photo-sensitive elements, wherein each of the light channels is formed by a plurality of interconnected apertures patterned in a plurality of opaque layers stacked over the photo-sensitive elements.

2. The eye-mountable device of claim 1, further comprising:
an antenna disposed on the substrate; and
a controller electrically connected to the image sensor and the antenna, wherein the controller is configured to (i) control the image sensor to obtain data indicative of light received by the photo-sensitive elements, and (ii) use the antenna to indicate the obtained data.

3. The eye-mountable device of claim 1, wherein the plurality of light channels defines a plurality of substantially non-overlapping fields of view that combine to define a cumulative field of view of the image sensor.

4. The eye-mountable device of claim 3, wherein the non-overlapping fields of view defined by the light channels subtend respective solid angles so as to substantially equally divide the cumulative field of view.

5. The eye-mountable device of claim 4, wherein each of the non-overlapping fields of view defined by the light channels are characterized by opening angles, in one dimension, of less than about 2.5 degrees.

6. The eye-mountable device of claim 1, wherein the plurality of opaque layers includes one or more stacked circuit components disposed on the plurality of photo-sensitive elements.

7. The eye-mountable device of claim 1, wherein the photo-sensitive elements comprise complementary metal oxide semiconductor devices.

8. The eye-mountable device of claim 7, wherein the complementary metal oxide semiconductor devices are arranged in rows and columns.

9. The eye-mountable device of claim 1, wherein the first end of each light channel has a larger opening than the second end.

10. The eye-mountable device of claim 1, wherein each of the light channels includes opaque sidewalls so as to prevent incident light received into a given light channel from reaching a photo-sensitive element corresponding to another light channel.

11. The eye-mountable device of claim 1, further comprising an energy harvesting system that captures electrical energy from incident radiation to power the controller.

12. The eye-mountable device of claim 1, wherein the image sensor is disposed on the substrate such that, while the eye-mountable device is mounted over the eye, respective openings of the light channels are positioned facing the eye.

13. The eye-mountable device of claim 1, wherein the image sensor is disposed on the substrate such that, while the eye-mountable device is mounted over the eye, respective openings of the light channels are positioned facing away from the eye.

* * * * *